(12) United States Patent
Wang et al.

(10) Patent No.: US 11,147,012 B2
(45) Date of Patent: *Oct. 12, 2021

(54) DCN PROCESSING METHOD FOR PLMN, UE, AND DCN SERVING NODE

(71) Applicant: HUAWEI TECHNOLOGIES CO., LTD., Shenzhen (CN)

(72) Inventors: Yuan Wang, Shanghai (CN); Fenqin Zhu, Shanghai (CN); Lin Shu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,918

(22) Filed: Jun. 15, 2020

(65) Prior Publication Data

US 2020/0314741 A1 Oct. 1, 2020

Related U.S. Application Data

(63) Continuation of application No. 16/037,781, filed on Jul. 17, 2018, now Pat. No. 10,701,625, which is a
(Continued)

(51) Int. Cl.
*H04W 4/00* (2018.01)
*H04W 48/18* (2009.01)
(Continued)

(52) U.S. Cl.
CPC ............ *H04W 48/18* (2013.01); *H04W 4/02* (2013.01); *H04W 48/08* (2013.01); *H04W 48/14* (2013.01); *H04W 76/11* (2018.02); *H04W 88/10* (2013.01)

(58) Field of Classification Search
CPC ....... H04W 48/18; H04W 76/11; H04W 4/02; H04W 48/08; H04W 48/14; H04W 88/10
See application file for complete search history.

(56) References Cited

U.S. PATENT DOCUMENTS

2005/0215253 A1    9/2005  Johannesson et al.
2013/0053033 A1*   2/2013  Jokinen ............ H04W 36/0016
                                                    455/436
(Continued)

FOREIGN PATENT DOCUMENTS

CN    101282508 A    10/2008
CN    101287285 A    10/2008
(Continued)

OTHER PUBLICATIONS

U.S. Appl. No. 16/037,781, filed Jul. 17, 2018.
(Continued)

*Primary Examiner* — Abdelnabi O Musa
(74) *Attorney, Agent, or Firm* — Leydig, Voit & Mayer, Ltd.

(57) ABSTRACT

The present application discloses a DCN processing method for a PLMN that is applied to a network sharing scenario. An access feedback message of a network side is received, and selection assistance information of a DCN and an identifier of a PLMN that serves UE are obtained from the access feedback message, so as to know a PLMN that is actually accessed by the UE. A correspondence between the selection assistance information of the DCN and the identifier of the PLMN that serves the UE is stored. When the UE moves to coverage of the PLMN, a requested DCN to be accessed can be directly determined according to the correspondence, and a RAN node is requested to access the determined DCN. Therefore, a redirection process is reduced, and resource overheads are reduced.

9 Claims, 13 Drawing Sheets

Related U.S. Application Data continuation of application No. PCT/CN2016/071305, filed on Jan. 18, 2016.

(51) Int. Cl.
    *H04W 48/14*     (2009.01)
    *H04W 76/11*     (2018.01)
    *H04W 4/02*     (2018.01)
    *H04W 48/08*     (2009.01)
    *H04W 88/10*     (2009.01)

(56) References Cited

U.S. PATENT DOCUMENTS

| | | |
|---|---|---|
| 2013/0225123 A1 | 8/2013 | Adjakple et al. |
| 2013/0267229 A1 | 10/2013 | Gopalakrishnan |
| 2015/0072678 A1* | 3/2015 | Zhang ............ H04W 8/065 455/433 |
| 2016/0277979 A1 | 9/2016 | Diachina et al. |

FOREIGN PATENT DOCUMENTS

| | | |
|---|---|---|
| CN | 101415220 A | 4/2009 |
| EP | 2852197 A1 | 3/2015 |

OTHER PUBLICATIONS

"Reference Architecture and Requirement Updates for Shared Networks", SA WG2 Meeting #112, S2-154324 (revision of S2-153851), Anaheim, US, (Nov. 16-20, 2015).

"3rd Generation Partnership Project;Technical Specification Group Services and System Aspects;General Packet Radio Service (GPRS) enhancements for Evolved Universal Terrestrial Radio Access Network (E-UTRAN) access (Release 13)," 3GPP TS 23.401 V13.5.0, 3rd Generation Partnership Project, Valbonne, France (Dec. 2015).

"3rd Generation Partnership Project;Technical Specification Group Services and System Aspects; Circuit Switched (CS) fallback in Evolved Packet System (EPS); Stage 2 (Release 13)," 3GPP TS 23.272 V13.2.0, 3rd Generation Partnership Project, Valbonne, France (Dec. 2015).

"Selection of CIoT DCN",SA WG2 Meeting #111, XP051013332, S2-153109, Chengdu, P.R. China, (Oct. 19-23, 2015).

"Solution #1: DCN Selection Assistance parameter description," SA WG2 Meeting #112, XP051035819 S2-154328, Anaheim, USA, (Nov. 16-20, 2015).

"Discussion on DCN selection based on Usage Type and DCN Type," 3GPP TSG-SA WG2#113, TD S2-160308, Frigate Bay, Saint Kitts and Nevis, KN, 3rd Generation Partnership Project, Valbonne, France (Jan. 25-29, 2016).

* cited by examiner

DCN PROCESSING METHOD FOR PLMN, UE, AND DCN SERVING NODE

CROSS-REFERENCE TO RELATED APPLICATIONS

This application is a continuation of U.S. patent application Ser. No. 16/037,781, filed on Jul. 17, 2018, which is a continuation of International Application No. PCT/CN2016/071305, filed on Jan. 18, 2016. All of the afore-mentioned patent applications are hereby incorporated by reference in their entireties.

TECHNICAL FIELD

Embodiments of the present application relate to the field of communications technologies, and in particular, to a DCN processing method for a PLMN, UE, and a DCN serving node.

BACKGROUND

Evolution of mobile communications networks and emergence of applications with different communications features are accompanied with emergence of UEs of different communications types. Therefore, operators put forward a solution of separately deploying DCNs (Dedicated Core Network) for UE of different communications types. In the prior art, to avoid as much as possible a redirection or handover process from occurring when UE (User Equipment) accesses a DCN, the UE includes selection assistance information of the DCN in an RRC (Radio Resource Control) connection message sent to a RAN (Radio Access Network) node, to indicate a DCN that the UE requests to access. The RAN node is configured to control the UE to access a mobile communications network by means of radio access, so that the RAN node may select, for the UE according to the selection assistance information that is of the DCN and reported by the UE, a PLMN (Public Land Mobile Network) to which the accessed DCN belongs. In this way, the UE binds an identifier of a PLMN that serves the UE to the selection assistance information of the DCN delivered by the accessed DCN, that is, stores a correspondence between the two.

However, in a network sharing scenario, core networks of multiple operators share a shared RAN node. Even if the UE accesses the PLMN to which the DCN belongs, if the RAN node is a shared RAN node, when the shared RAN node broadcasts only an identifier of a common PLMN, or when the UE can obtain only a identifier of the common PLMN, the UE is actually bound to a correspondence between an identifier of a common PLMN and network selection assistance information. An identifier of a PLMN that serves the UE and that is actually accessed by the UE is different from the identifier of the common PLMN, and therefore, the UE cannot know the actually accessed PLMN. Consequently, when the UE moves from a range of the shared RAN node to a range of a RAN node exclusive to the actually accessed PLMN, the UE does not store a correspondence between the PLMN and selection assistance information of a DCN. Therefore, according to the existing solution, the UE needs to access a network by using selection assistance information of a default DCN, and the RAN node exclusive to the actually accessed PLMN re-selects an accessed DCN for the UE. Consequently, a redirection process for selecting a DCN caused, and resource overheads are increased.

SUMMARY

Embodiments of the present application provide a DCN processing method for a PLMN. An access feedback message of a network side is received, and selection assistance information of a DCN and an identifier of a PLMN that serves UE are obtained from the access feedback message, so as to know a PLMN that is actually accessed by the UE. A correspondence between the selection assistance information of the DCN and the identifier of the PLMN that serves the UE is stored. When the UE moves to coverage of the PLMN, a requested DCN to be accessed can be directly determined according to the correspondence, and a RAN node is requested to access the determined DCN. Therefore, a redirection process is reduced, and resource overheads are reduced.

According to a first aspect, the present application provides a DCN processing method for a PLMN. An access feedback message of a network side is received, and selection assistance information of a DCN and an identifier of a PLMN that serves UE are obtained from the access feedback message, so as to know a PLMN that is actually accessed by the UE.

In a possible design, after the PLMN that is actually accessed by the UE is known, the UE stores a correspondence between the selection assistance information of the DCN and the identifier of the PLMN that serves the UE, and a correspondence between the selection assistance information of the DCN and an identifier of a common PLMN in user location information. When the UE moves to coverage of the PLMN, a requested DCN to be accessed can be directly determined according to the stored correspondences, and a RAN node is requested to access the determined DCN. Therefore, a redirection process is reduced, and resource overheads are reduced.

In a possible design, the selection assistance information of the DCN may be a type of the DCN, or a type identifier of the DCN, so that a radio access network RAN node determines the DCN and/or a DCN serving node according to the type of the DCN or the type identifier of the DCN.

In a possible design, that the identifier of the PLMN that serves the UE is different from an identifier of a PLMN in the user location information may be that the identifier of the PLMN that serves the UE is not included in the user location information, or the identifier of the PLMN stored in the user location information is an identifier of a common PLMN.

In a possible design, the UE may obtain the access feedback message by using an NAS accept message sent by the DCN serving node.

According to a second aspect, the present application provides a DCN processing method for a PLMN. After receiving an access request message sent by UE, a DCN serving node indicates, by returning an access feedback message, a PLMN that is actually accessed by the UE.

In a possible design, the DCN serving node returns the access feedback message after determining that the UE does not support network sharing, or a current shared RAN node broadcasts only a common PLMN, or user location information sent to the UE does not include an identifier of the actually accessed PLMN, or an identifier of a PLMN included in user location information is not the identifier of the actually accessed PLMN.

According to a third aspect, the present application provides a DCN processing method for a PLMN. If UE determines that a DCN that serves the UE is configured for a requested PLMN to be accessed, selection assistance information of the DCN is carried in an access request message that is to be sent. Alternatively, if UE finds that a DCN that serves the UE is not configured for a requested PLMN to be accessed, an access request message that is to be sent does not include selection assistance information of the DCN, and the UE sends an NAS message to a network side. The NAS message carries a usage type of the UE, to request the network side to allocate a DCN to the UE.

In a possible design, the UE obtains a correspondence between an identifier of a public land mobile network PLMN and selection assistance information of a DCN, and the UE determines, according to an identifier of an accessed PLMN and the correspondence, that the accessed PLMN has the corresponding selection assistance information of the dedicated core network DCN that serves the UE.

In a possible design, when the UE has no correspondence between an identifier of a public land mobile network PLMN and selection assistance information of a DCN, the UE determines that the accessed PLMN has no corresponding selection assistance information of the DCN that serves the UE. Alternatively, the UE obtains a correspondence between an identifier of a public land mobile network PLMN and selection assistance information of a DCN, and the UE determines, according to an identifier of an accessed PLMN and the correspondence, that the accessed PLMN has no corresponding selection assistance information of the dedicated core network DCN that serves the UE.

In a possible design, the UE receives a correspondence that is between an identifier of a PLMN and selection assistance information of a DCN and that is sent by the network side, or the UE obtains a stored correspondence between an identifier of a PLMN and selection assistance information of a DCN.

In a possible design, the access request message includes a non-access stratum NAS message, and the NAS message includes the usage type of the UE.

In a possible design, the usage type of the UE is pre-configured in the UE.

In a possible design, the UE determines that the accessed public land mobile network PLMN has the corresponding selection assistance information of the dedicated core network DCN that serves the UE, and the UE includes the selection assistance information of the DCN and the usage type of the UE in the access request message sent to a radio access network RAN node.

In a possible design, that the access request message includes the usage type of the UE is specifically: the NAS message includes the usage type of the UE.

According to a fourth aspect, the present application provides a DCN processing method for a PLMN. After an NAS message is forwarded by a shared RAN node and received by a DCN serving node, the DCN serving node may quickly determine, according to a usage type of UE, whether the DCN serving node can serve the UE, and if the DCN serving node cannot serve the UE, the UE may be quickly redirected to a DCN serving node that can serve the UE.

In a possible design, the DCN serving node may obtain, from an HSS according to the usage type of the UE provided by the UE, a usage type of the UE stored in an HSS, and determine, with reference to the usage type of the UE provided by the UE and the usage type of the UE stored by the HSS, whether to serve the UE.

According to a fifth aspect, the present application provides UE, and the UE has a function of implementing UE behaviors in the foregoing method designs. The function may be implemented by using hardware or may be implemented by executing corresponding software by hardware.

The hardware or the software includes one or more modules corresponding to the foregoing function. The module may be software and/or hardware. The UE includes a receiving and saving unit, a storage unit, a determining unit, and an obtaining unit, and is configured to perform related steps of the DCN processing methods for a PLMN that are provided in the first aspect and the third aspect.

In a possible design, a structure of the UE includes a receiver, a transmitter, and a processor. The processor is configured to enable the UE to perform corresponding functions in the foregoing methods. The transmitter is configured to support communication between the UE and a DCN serving node and communication between the UE and a RAN node. The UE may further include a memory. The memory is configured to be coupled to the processor, and the memory stores a program instruction and data necessary to the UE. The UE may further include a communications interface used for communication between the UE and another device or a communications network.

According to a sixth aspect, the present application provides a DCN serving node, and the DCN serving node has a function of implementing DCN serving node behaviors in the foregoing method designs. The function may be implemented by using hardware or may be implemented by executing corresponding software by hardware. The hardware or the software includes one or more modules corresponding to the foregoing function. The module may be software and/or hardware. The DCN serving node includes a determining unit, a receiving unit, and a sending unit, and is configured to perform related steps of the DCN processing methods for a PLMN that are provided in the second aspect and the fourth aspect.

In a possible design, a structure of the DCN serving node includes a receiver, a transmitter, and a processor. The processor is configured to enable the DCN serving node to perform corresponding functions in the foregoing methods. The transmitter is configured to support communication between the DCN serving node and UE and communication between the DCN serving node and a RAN node. The DCN serving node may further include a memory. The memory is configured to be coupled to the processor, and the memory stores a program instruction and data necessary to the DCN serving node. The DCN serving node may further include a communications interface used for communication between the DCN serving node and another device or a communications network.

According to a seventh aspect, the present application provides a computer storage medium that is used to store a computer software instruction used by the foregoing UE, and the computer storage medium includes a program designed for performing the foregoing aspects.

According to an eighth aspect, the present application provides a computer storage medium that is used to store a computer software instruction used by the foregoing DCN serving node, and the computer storage medium includes a program designed for performing the foregoing aspects.

Compared with the prior art, the solutions provided in the present application can reduce resource overheads and centrally schedule mobile networks.

These aspects or other aspects of the present application are described in the following embodiments in a more concise and understandable manner.

DESCRIPTION OF EMBODIMENTS

Figure 1:
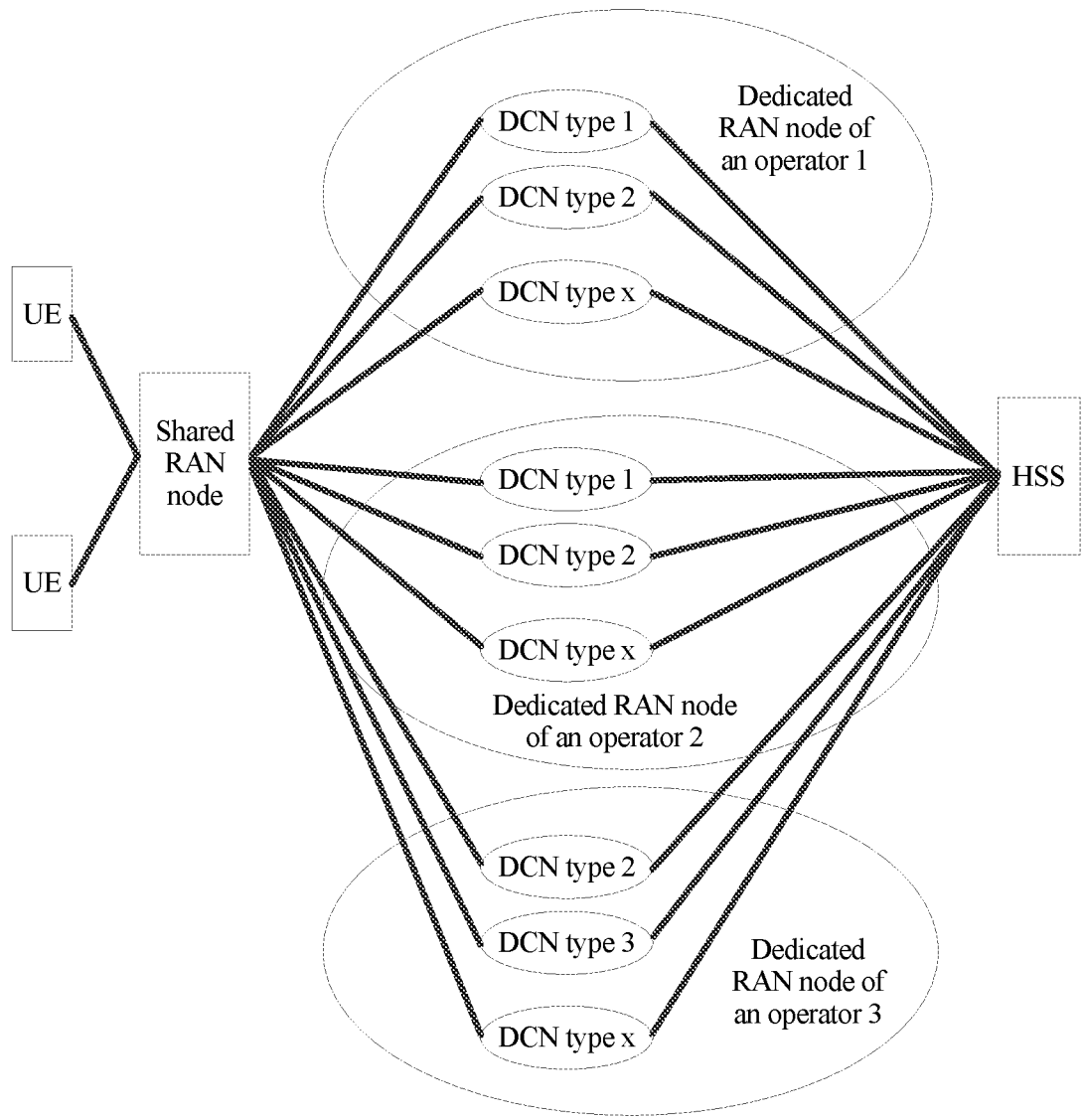
FIG. 1 is a schematic diagram of an embodiment of a system architecture according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

For ease of understanding of the present application, prior-art content related to the present application is first described below. In 3GPP (the 3rd Generation Partnership Project), a dedicated research project is launched for DCN deployment, and the following requirements are imposed.

(1) DCN deployment does not affect implementation of existing UE.

(2) A new identifier of a PLMN does not need to be introduced for DCN deployment.

(3) A same RAN node can share multiple different DCNs.

(4) A same RAN node may be configured to simultaneously support UEs of multiple different DCN types. In a current 3GPP communications system, an MME (Mobility Management Entity) is a RAN node in a 4G architecture, and an SGSN (Serving GPRS Support Node) is a RAN node in a 3G architecture.

(5) In a network deployed with a DCN, all MMEs need to support a function of a dedicated RAN node, so that an MME of a corresponding DCN type is selected for UE, and the UE is registered with a data gateway.

(6) In a network deployed with a DCN, all MMEs need to redirect or hand over UE to an appropriate DCN, and transfer of selection assistance information of a DCN of the UE between the MMEs is supported, so that the UE is registered with a DCN of a corresponding DCN type.

However, in a network sharing scenario, if an accessed RAN node is a shared RAN node, when the shared RAN node broadcasts only an identifier of a common PLMN or UE can obtain only a common PLMN due to a UE type, the UE is actually bound to a correspondence between an identifier of a common PLMN and selection assistance information of a DCN. For example, in the network sharing scenario, the UE accesses a DCN of a PLMN A by using the shared RAN node, and the DCN of the PLMN A delivers selection assistance information of the DCN to the UE. If the shared RAN node can broadcast only an identifier of a common PLMN, or the UE can obtain only an identifier of a common PLMN due to a UE type limitation, the UE stores a correspondence between an identifier of a common PLMN and selection assistance information of a DCN. When the UE moves to coverage of a dedicated RAN node of the PLMN A, the UE receives an identifier that is of the PLMN A and broadcast by the dedicated RAN node of the PLMN A. The UE stores only the correspondence between an identifier of a common PLMN and selection assistance information of a DCN, but does not store a correspondence between an identifier of a PLMN A and selection assistance information of a DCN, and therefore, the UE cannot report, to the dedicated RAN node, the selection assistance information that is of the DCN and that is corresponding to the identifier of the PLMN A, but to report only pre-stored selection assistance information of a default DCN. In this case, the dedicated RAN node needs to re-select an appropriate DCN for the UE, and consequently, a redirection process is caused.

In the present application, after a shared RAN node configures an accessed DCN for UE, the UE obtains, by receiving an access feedback message sent by the accessed DCN or the shared RAN node, an identifier of an accessed PLMN that serves the UE. Therefore, the UE can determine the actually accessed PLMN, and can store a correspondence between selection assistance information of a DCN and an identifier of a PLMN that serves the UE. When the UE moves to coverage of a PLMN to which the DCN belongs, the UE obtains an identifier that is of the PLMN and broadcast by a dedicated RAN node of the PLMN, and then determines the accessed DCN according to the pre-stored correspondence between an identifier of a PLMN and selection assistance information of a DCN. In this way, the UE directly requests, by using the dedicated RAN node, to access the determined DCN, and a redirection process is reduced.

FIG. 1 is a schematic diagram of an embodiment of a system architecture according to an embodiment of the present application, and method procedures in FIG. 3A, FIG. 3B, FIG. 3C, and FIG. 3D to FIG. 5A, FIG. 5B, FIG. 5C, and FIG. 5D below are implemented based on the system architecture. The system architecture shown in FIG. 1 includes UE, a shared RAN node, a DCN serving node, a dedicated RAN node, and an HSS (Home Subscriber Server). Optionally, the shared RAN node in the present application is applicable to a network sharing scenario, and the dedicated RAN node is applicable to a dedicated network scenario. Specifically:

The UE is user equipment. In the present application, the UE may request to access a shared network or a dedicated network, receive an access feedback message sent by the shared RAN node or an accessed DCN serving node, and obtain, from the access feedback message, user location information, selection assistance information of a DCN that serves the UE, and an identifier of a PLMN that serves the UE, so as to store a correspondence between the selection assistance information of the accessed DCN and the identifier of the PLMN that serves the UE.

The shared RAN node is a radio access network node. The shared RAN node is an eNodeB (evolved NodeB) in an EPS (Evolved Packet System) architecture. The shared RAN node is a NodeB in a 3G communications system architecture. The shared RAN node in the present application is a same RAN node shared by at least one PLMN in the system architecture in FIG. 1, and each of the at least one PLMN includes at least one DCN. In the network sharing scenario, the shared RAN node may inform the UE of an access feedback message according to a DCN request, and the access feedback message carries selection assistance information of a DCN configured by the shared RAN node for the UE, and an identifier of a PLMN that serves the UE, so that the UE knows selection assistance information of an accessed DCN and the identifier of the PLMN that serves the UE.

A DCN is a dedicated core network, and the DCN serving node is a node device in the DCN and is configured to serve UEs of different communications types. In FIG. 1, an operator subscribes UE with a same communications feature to a DCN type, and deploys a dedicated core network element for the UE, including an MME, a data gateway, and the like, so that the UE with a same DCN type is registered to the core network element dedicatedly deployed for the UE. The core network element may include multiple DCN types at the same time, and this helps the operator with targeted management and maintenance on UE of different types. A dedicated network is for a dedicated purpose, so that efficiency of access and mobility management and session management of massive UEs is improved, and network maintenance costs are reduced. In the present application, after confirming access of the UE, the DCN sends, to the UE, an NAS accept message that carries an access feedback message. The access feedback message carries selection assistance information of a DCN configured by the shared RAN node for the UE, and an identifier of a PLMN that serves the UE, so that the UE knows selection assistance information of an accessed DCN and the identifier of the PLMN that serves the UE.

The dedicated RAN node is also a radio access network node, and in the present application, serves only a specific operator and a corresponding PLMN, and broadcasts an identifier of a specific PLMN. After setting up a connection to the UE, the dedicated RAN node receives a setup complete message sent by the UE, and the setup complete message carries selection assistance information of a determined DCN to be accessed and a DCN access request, to request the dedicated RAN node to allocate an accessed DCN to the UE according to the selection assistance information of the determined DCN to be accessed. For example, as shown in FIG. 1, a dedicated RAN node of an operator 1 serves a PLMN A, and manages three DCNs of a first group: a DCN type 1, a DCN type 2, and a DCN type x, and each DCN supports a different communications type in the PLMN A. A dedicated RAN node of an operator 2 serves a PLMN B, and manages three DCNs of a second group: a DCN type 1, a DCN type 2, and a DCN type x, and each DCN supports a different communications type in the PLMN B. A dedicated RAN node of an operator 3 serves a PLMN C, and manages three DCNs of a third group: a DCN type 1, a DCN type 2, and a DCN type x, and each DCN supports a different communications type in the PLMN C. For example, the UE accesses the dedicated RAN node of the operator 1. When the UE enters coverage of the PLMN A of the dedicated RAN node of the operator 1, the dedicated RAN node determines, by obtaining selection assistance information that is of a DCN and sent by the UE, a DCN that serves the UE. The selection assistance information of the DCN is determined by the UE according to a pre-stored correspondence between an identifier of a PLMN A and selection assistance information of a DCN.

The HSS is a home subscriber server, and is configured to store subscription data of the UE. The subscription data includes usage type information of the UE, and a usage type of the UE is corresponding to selection assistance information of a DCN applicable to the UE. After the DCN receives a DCN access request sent by the shared RAN node or the dedicated RAN node, the DCN sends a UE usage type obtaining request to the HSS. The HSS sends the usage type of the UE to the DCN according to the obtaining request sent by the DCN, so that the DCN compares the usage type of the UE provided by the HSS with the usage type provided by the UE. If the usage type of the UE provided by the HSS matches the usage type provided by the UE, the DCN determines to serve the UE. If the usage type of the UE provided by the HSS does not match the usage type provided by the UE, the DCN instructs a node that sends the selection assistance information of the DCN to allocate a new DCN.

According to this embodiment of the present application, UE may obtain an identifier of an accessed PLMN that serves the UE, so as to determine a PLMN to which an accessed DCN belongs. When the UE moves to coverage of the PLMN, a redirection process can be reduced, and resource overheads can be reduced.

Figure 2:
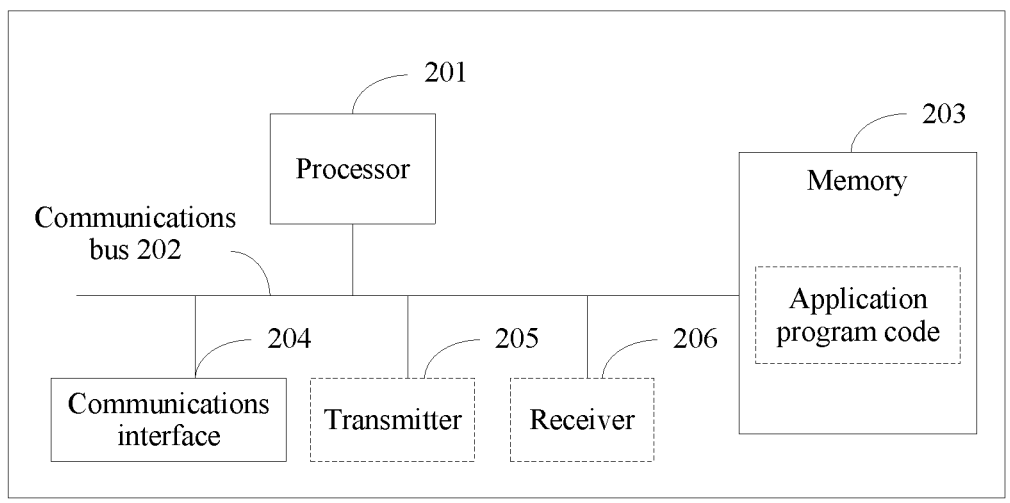
FIG. 2 is a schematic diagram of a computer device according to an embodiment of the present application.
Figure 3A:
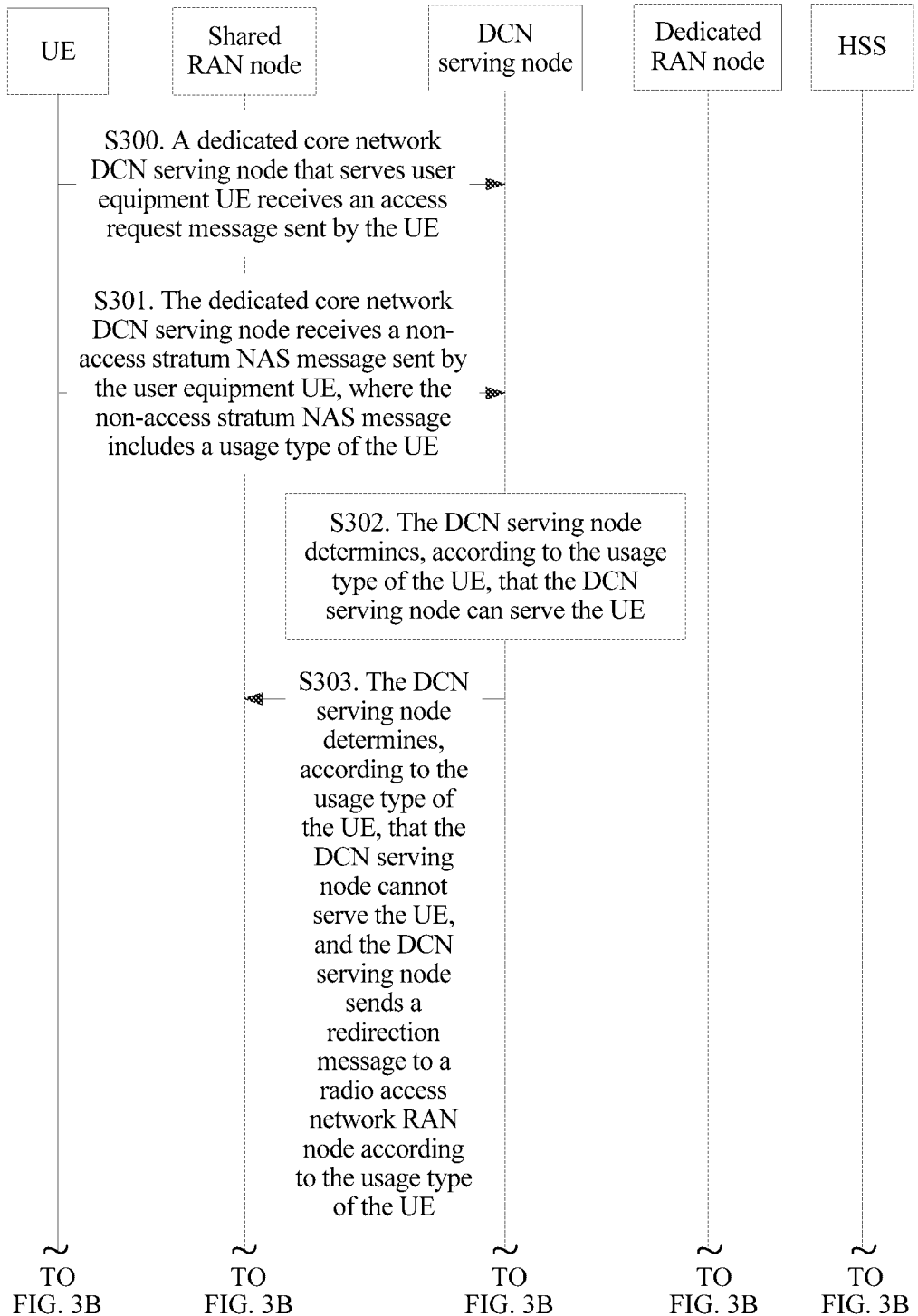
FIG. 3A, FIG. 3B, FIG. 3C, and FIG. 3D are a schematic flowchart of a method for determining access to a public land mobile network PLMN according to an embodiment of the present application.
Figure 3B:
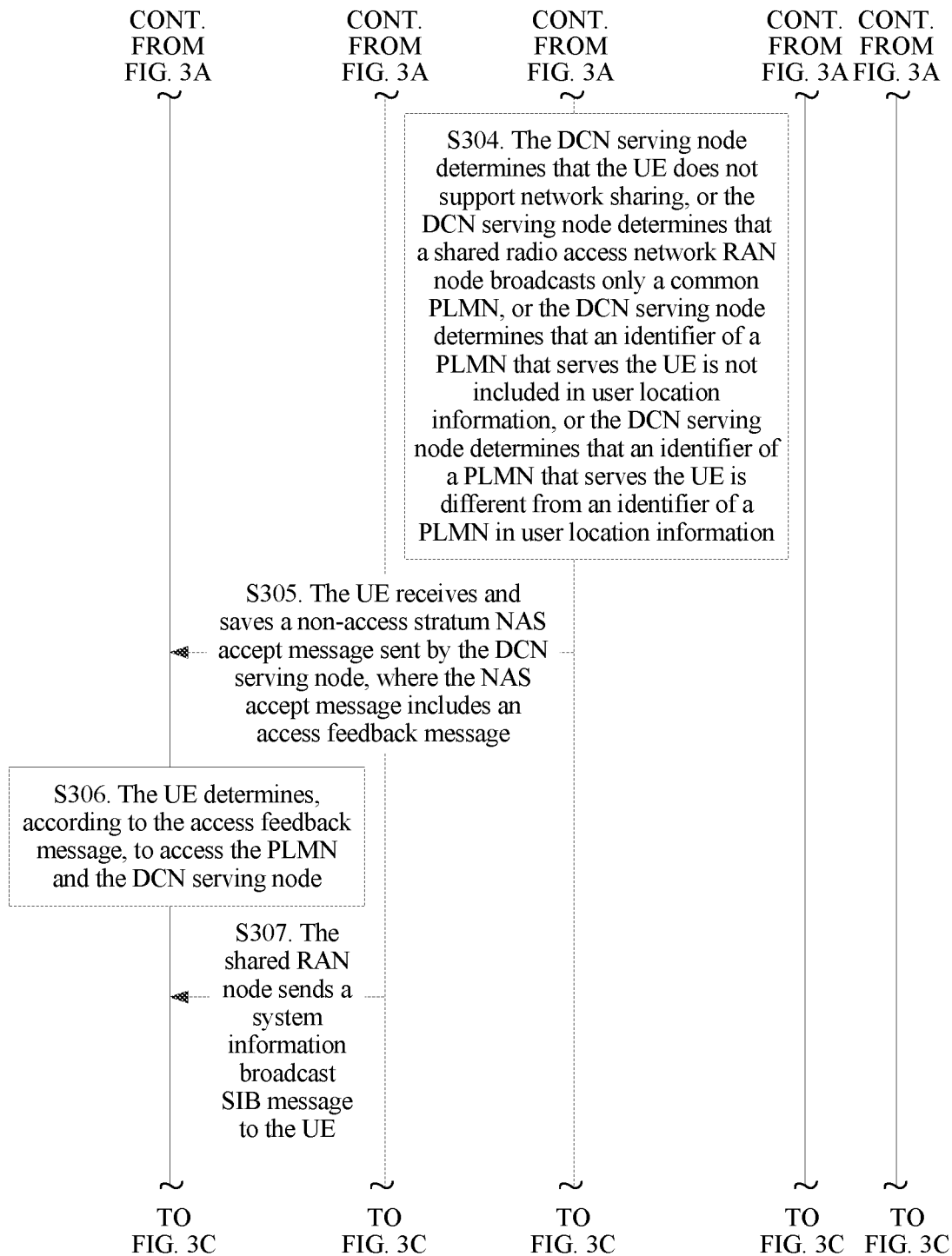
Figure 3C:
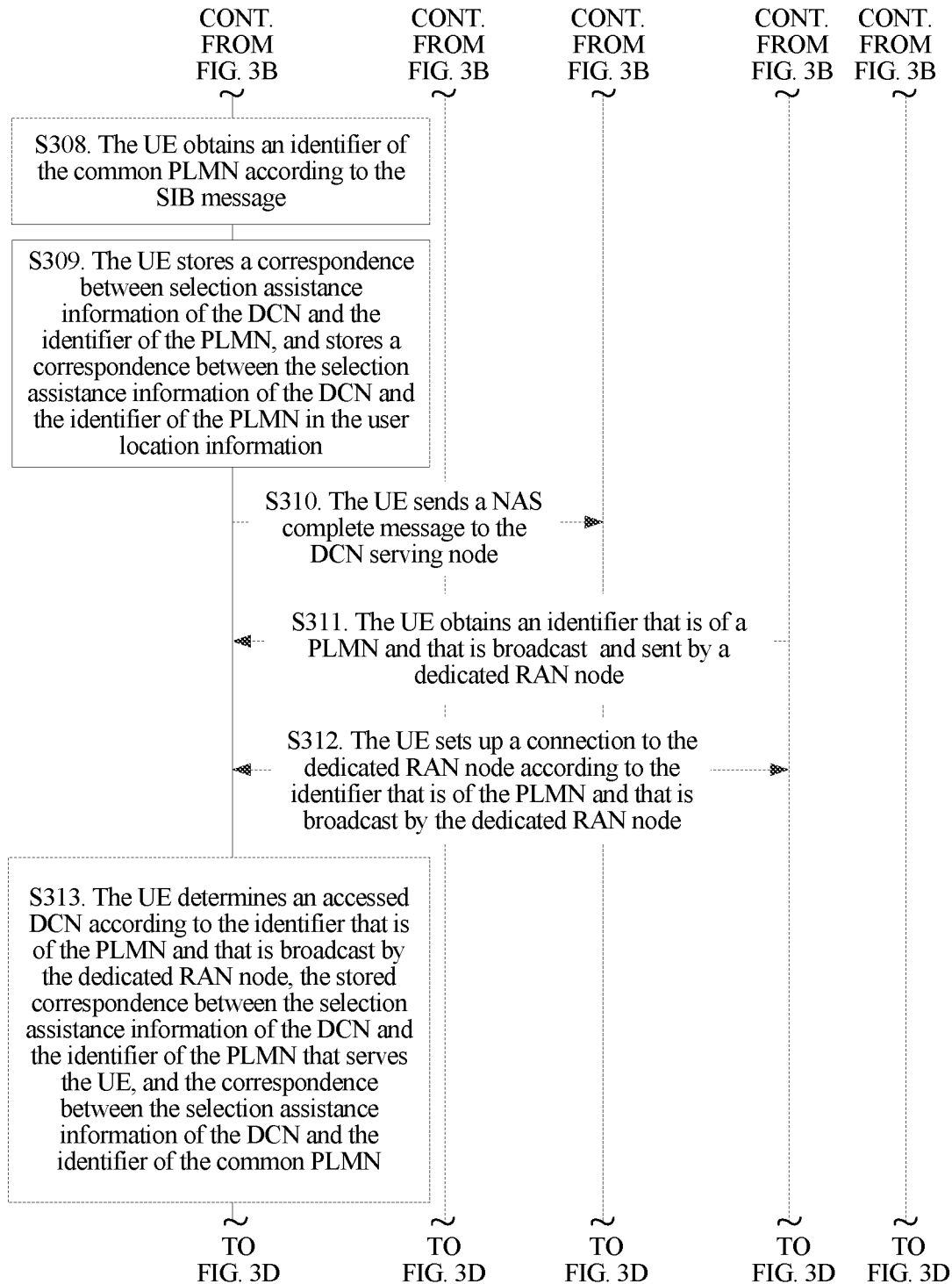
Figure 3D:
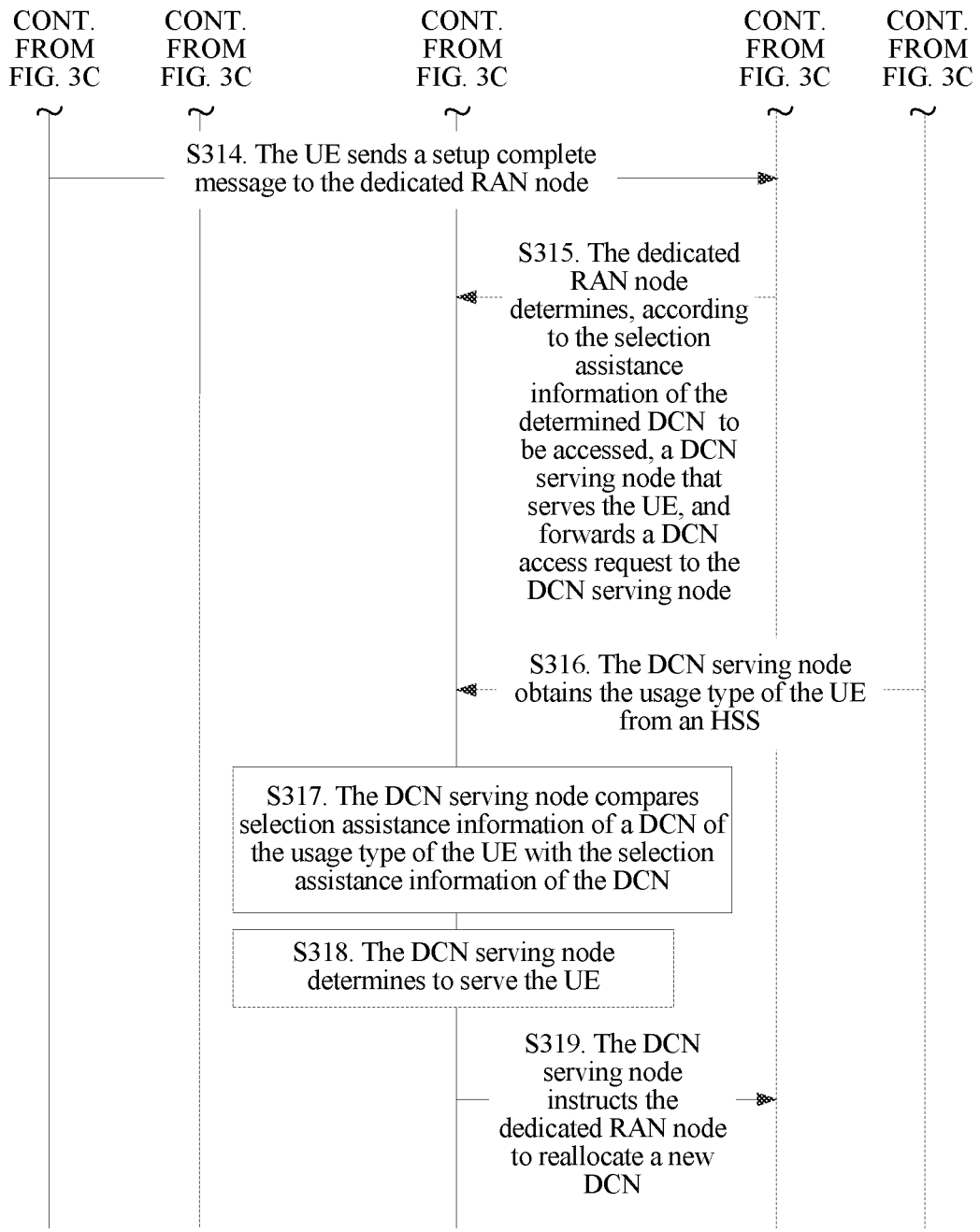

As shown in FIG. 2, the UE, the DCN serving node, and the shared RAN node in FIG. 1 may be implemented by a computer device (or a system) in FIG. 2.

FIG. 2 is a schematic diagram of a computer device according to an embodiment of the present application. The computer device includes at least one processor 201, a communications bus 202, a memory 203, at least one communications interface 204, a transmitter 205, and a receiver 206.

The processor 201 may be a general-purpose central processing unit (CPU), a microprocessor, an application-specific integrated circuit (ASIC), or one or more integrated circuits configured to control program execution of the solutions of the present application.

The communications bus 202 may include a path used to transmit information between the foregoing components. The communications interface 204 may be any apparatus such as a transceiver, and is configured to communicate with another device or communications network, such as an Ethernet, a radio access network (RAN), or a wireless local area network (WLAN).

The memory 203 may be, but is not limited to a read-only memory (ROM) or a static storage device of another type that can store static information and an instruction; a random access memory (RAM) or a dynamic storage device of another type that can store information and an instruction; or an electrically erasable programmable read-only memory (EEPROM), a compact disc read-only memory (CD-ROM) or another compact disc storage, an optical disc storage (including a compact disc, a laser disc, an optical disc, a digital versatile disc, a blue-ray disc, or the like), a disk storage medium or another magnetic storage device, or any other medium that can be used to carry or store expected program code in an instruction form or in a data structure form and can be accessed by a computer. The memory may exist individually and be connected to the processor by using the bus. Alternatively, the memory may be integrated with the processor.

The memory 203 is configured to store application program code that executes the solutions of the present application, and the processor 201 controls execution of the application program code. The processor 201 is configured to execute the application program code stored in the memory 203.

When the computer device shown in FIG. 2 is UE, in one aspect, the code stored in the memory 203 may be used for implementing a DCN processing method for a PLMN provided in the present application. For example, after a DCN is accessed in a shared network, an access feedback message sent by the DCN or a RAN node is received, and selection assistance information of the DCN and an identifier of a PLMN that serves the UE are obtained by using the access feedback message. The access feedback message is carried in an NAS accept message.

In a specific implementation, in an embodiment, the computer device may further include the transmitter 205 and the receiver 206. The transmitter 205 communicates with the processor 201, and the receiver 206 communicates with the processor 201 and may receive, in multiple manners, signaling sent by the DCN or a shared RAN node.

When the computer device shown in FIG. 2 is a DCN serving node, in another aspect, the code stored in the memory 203 may be used for implementing a DCN processing method for a PLMN provided in the present application. For example, after the DCN determines to serve UE, an access feedback message is sent to the UE, to indicate selection assistance information of the DCN and an identifier of a PLMN that serves the UE. The access feedback message is carried in an NAS accept message.

In a specific implementation, in an embodiment, the computer device may further include the transmitter 205 and the receiver 206. The transmitter 205 communicates with the processor 201, and the receiver 206 communicates with the processor 201 and may receive, in multiple manners, signaling sent by the UE or a shared RAN node.

When the computer device shown in FIG. 2 is a shared RAN node, in still another aspect, the code stored in the memory 203 may be used for implementing a DCN processing method for a PLMN provided in the present application. For example, after a DCN that serves UE is determined, a context setup request message or a downlink transfer message sent by the DCN is received, so that an access feedback message is sent to the UE according to the context setup request message or the downlink transfer message, to indicate selection assistance information of the DCN and an identifier of a PLMN to which the DCN belongs. The access feedback message is carried in an NAS accept message.

In a specific implementation, in an embodiment, the computer device may further include the transmitter 205 and the receiver 206. The transmitter 205 communicates with the processor 201, and the receiver 206 communicates with the processor 201 and may receive, in multiple manners, signaling sent by the DCN or the UE.

The foregoing computer device may be a general-purpose computer device or a dedicated computer device. In a specific implementation, the computer device may be a desktop computer, a portable computer, a network server, a personal digital assistant (PDA), a mobile phone, a tablet computer, a wireless terminal device, a communications device, an embedded device, or a device with a structure similar to that in FIG. 2. A type of the computer device is not limited in this embodiment of the present application.

FIG. 3A, FIG. 3B, FIG. 3C, and FIG. 3D are a schematic flowchart of a dedicated core network DCN processing method for a public land mobile network PLMN according to an embodiment of the present application. The method is implemented by the UE, the shared RAN node, the DCN serving node, the dedicated RAN node, and the HSS in the system architecture shown in FIG. 1, and mainly describes a process of determining access to a PLMN. In addition, in this embodiment, interaction between the UE, the shared RAN node, and the DCN serving node is applicable to a network sharing scenario, and interaction between the UE, the dedicated RAN node, and the HSS is applicable to a dedicated network scenario.

As shown in FIG. 3A, FIG. 3B, FIG. 3C, and FIG. 3D, a procedure of the dedicated core network DCN processing method for a public land mobile network PLMN in this embodiment may include the following steps.

S300. A dedicated core network DCN serving node that serves user equipment UE receives an access request message sent by the UE.

Specifically, the shared RAN node serves at least one public land mobile network PLMN, and each of the at least one PLMN includes at least one DCN. In the network sharing scenario, before initially accessing a DCN, the UE first sets up an RRC connection to the shared RAN node. After setting up the RRC connection to the shared RAN node, if the UE determines that an accessed PLMN has corresponding selection assistance information of a DCN that serves the UE, the UE includes the selection assistance information of the DCN, a non-access stratum NAS request message, and an identifier of a requested PLMN to be accessed in an access request message (an RRC Connection Setup Complete message) sent to the shared RAN node. The non-access stratum NAS request message may be an attach message, a TAU (Tracking Area Update) message, or the like. The selection assistance information of the DCN indicates a DCN that the UE expects to access. The shared RAN node configures a DCN serving node for the UE according to the selection assistance information of the requested DCN to be accessed and the identifier of the requested PLMN to be accessed, and forwards a DCN access request to the DCN serving node, and the DCN serving node finally determines to serve the UE.

S301. The dedicated core network DCN serving node receives a non-access stratum NAS message sent by the user equipment UE, where the non-access stratum NAS message includes a usage type of the UE.

Specifically, if the UE determines that the accessed PLMN has no corresponding selection assistance information of the DCN that serves the UE, the UE does not include the selection assistance information of the DCN in the access request message sent to the shared RAN node, the UE includes the usage type of the UE to the non-access stratum NAS message, the shared RAN node forwards the NAS message in a core network element, and the DCN serving node allocates a DCN to the UE according to the usage type of the UE.

Specifically, the UE always includes the usage type of the UE in the non-access stratum NAS message of the access request message. Then the UE determines whether the accessed PLMN has the corresponding selection assistance information of the DCN that serves the UE. The UE first obtains the identifier of the accessed PLMN, and if the UE determines that the accessed PLMN has the corresponding selection assistance information of the DCN that serves the UE, the UE includes the selection assistance information of the DCN in the access request message sent to the shared RAN node. If the UE determines that the accessed PLMN has no corresponding selection assistance information of the DCN that serves the UE, the UE does not include the selection assistance information of the DCN in the access request message sent to the shared RAN node.

Optionally, a specific step in which the UE determines that the accessed PLMN has the corresponding selection assistance information of the dedicated core network DCN that serves the UE is as follows: The UE obtains a correspondence between an identifier of a public land mobile network PLMN and selection assistance information of a DCN, and the UE determines, according to the identifier of the accessed PLMN and the correspondence, that the accessed PLMN has the corresponding selection assistance information of the dedicated core network DCN that serves the UE. For example, a process of obtaining the identifier of the accessed PLMN by the UE may be: The UE receives PLMN information broadcast by the RAN node. The PLMN information broadcast by the RAN node may be separate information about a common PLMN, or may be multiple pieces of PLMN information. The UE selects one PLMN, so that the identifier of the accessed PLMN is obtained.

Optionally, a specific step in which the UE determines that the accessed PLMN has no corresponding selection assistance information of the DCN that serves the UE is as follows: When the UE has no correspondence between an identifier of a public land mobile network PLMN and selection assistance information of a DCN, the UE determines that the accessed PLMN has no corresponding selection assistance information of the DCN that serves the UE; or the UE obtains a correspondence between an identifier of a public land mobile network PLMN and selection assistance information of a DCN, and the UE determines, according to the identifier of the accessed PLMN and the correspondence, that the accessed PLMN has no corresponding selection assistance information of the dedicated core network DCN that serves the UE.

Optionally, a specific step in which the UE obtains the correspondence between an identifier of a public land mobile network PLMN and selection assistance information of a DCN is as follows: The UE receives a correspondence that is between an identifier of a PLMN and selection assistance information of a DCN and that is sent by a network side; or the UE obtains a stored correspondence between an identifier of a PLMN and selection assistance information of a DCN. The identifier of the PLMN and the selection assistance information of the DCN that are obtained by the UE may be from a network that is previously accessed, or may be from a current network.

Optionally, the access request message includes the non-access stratum NAS message, and that the access request message includes the usage type of the UE is specifically: the NAS message includes the usage type of the UE. The usage type of the UE is pre-configured in the UE.

Optionally, a specific step in which the UE determines that the accessed PLMN has the corresponding selection assistance information of the dedicated core network DCN that serves the UE is as follows: If the UE determines that the accessed public land mobile network PLMN has the corresponding selection assistance information of the dedicated core network DCN that serves the UE, the UE includes the selection assistance information of the DCN and the usage type of the UE in the access request message sent to the radio access network RAN node.

Optionally, the usage type of the UE is pre-configured in the UE.

A beneficial effect of including the usage type of the UE in the NAS message is specifically as follows: After the NAS message is forwarded by the shared RAN node and received by the DCN serving node, the DCN serving node may quickly determine, according to the usage type of the UE, whether the DCN serving node can serve the UE. If the DCN serving node cannot serve the UE, the UE may be quickly redirected to a DCN serving node that can serve the UE, and the DCN serving node does not need to request subscription data of the UE from the HSS. Then it is determined, according to a usage type of the UE in the subscription data, whether the DCN serving node can serve the UE.

S302. The DCN serving node determines, according to the usage type of the UE, that the DCN serving node can serve the UE.

Specifically, the DCN serving node requests to obtain the subscription data of the UE from the HSS, the subscription data includes the usage type of the UE, and the DCN serving node determines, according to the usage type of the UE provided by the UE and/or the usage type of the UE stored in the HSS, that the DCN serving node can serve the UE. Therefore, the DCN serving node allocates the selection assistance information of the DCN to the UE, and sends the selection assistance information of the DCN to the UE.

Optionally, the selection assistance information of the DCN is a type of the DCN, or a type identifier of the DCN, or information used by an operator to identify the DCN, and is used by the RAN node to determine the DCN and/or the DCN serving node.

S303. The DCN serving node determines, according to the usage type of the UE, that the DCN serving node cannot serve the UE, and the DCN serving node sends a redirection message to a shared radio access network RAN node according to the usage type of the UE.

Specifically, if the DCN serving node determines, according to the usage type of the UE, that the DCN serving node cannot serve the UE, the DCN serving node sends the redirection message to the shared RAN node.

S304. The DCN serving node determines that the UE does not support network sharing, or the DCN serving node determines that the shared radio access network RAN node broadcasts only a common PLMN, or the DCN serving node determines that an identifier of a PLMN that serves the UE is not included in user location information, or the DCN serving node determines that an identifier of a PLMN that serves the UE is different from an identifier of a PLMN in user location information.

Specifically, if the DCN serving node determines, according to the usage type of the UE, that the DCN serving node can serve the UE, the DCN serving node determines a current network attribute. For example, the UE does not support network sharing, or the shared RAN node broadcasts only the common PLMN, or the identifier of the PLMN that serves the UE is not included in the user location information, or the identifier of the PLMN that serves the UE is different from the identifier of the PLMN in the user location information.

Optionally, that the identifier of the PLMN that serves the UE is different from the identifier of the PLMN in the user location information is that the identifier of the PLMN that serves the UE is not included in the user location information. In this embodiment of the present application, the identifier of a PLMN in the user location information may be an identifier of a common PLMN.

S305. The UE receives and saves a non-access stratum NAS accept message sent by the DCN serving node, where the NAS accept message includes an access feedback message.

Specifically, the UE receives the non-access stratum NAS accept message sent by the DCN serving node. The NAS accept message carries the access feedback message, and the access feedback message carries the user location information, the selection assistance information of the DCN that serves the UE, and the identifier of the PLMN that serves the UE, to indicate a PLMN that is actually accessed by the DCN serving node.

Optionally, the selection assistance information of the DCN is a type of the DCN, or a type identifier of the DCN, or information used by an operator to identify the DCN, and is used by the RAN node to determine the DCN and/or the DCN serving node.

Optionally, that the identifier of the PLMN that serves the UE is different from the identifier of the PLMN in the user location information is that the identifier of the PLMN that serves the UE is not included in the user location information. In this embodiment of the present application, the identifier of a PLMN in the user location information may be an identifier of a common PLMN.

S306. The UE determines, according to the access feedback message, to access the PLMN and the DCN serving node.

Specifically, after receiving the access feedback message sent by the DCN serving node, the UE determines, by using the obtained selection assistance information of the DCN and the identifier of the PLMN that serves the UE, the PLMN that serves the UE, and accesses the DCN serving node in the PLMN that serves the UE.

S307. The shared RAN node sends a system information broadcast SIB message to the UE.

Specifically, in the network sharing scenario, the shared RAN node may further inform, by using the system information broadcast (SIB) message, the shared RAN node of at least one PLMN that is currently serving the UE.

S308. The UE obtains an identifier of the common PLMN according to the SIB message.

Specifically, in the network sharing scenario, when the shared RAN node broadcasts only one common PLMN in the SIB message, or when the UE can identify, due to a terminal type limitation, only a common PLMN in the SIB message broadcast by the shared RAN node, the UE obtains an identifier of the common PLMN from the SIB message.

S309. The UE stores a correspondence between selection assistance information of the DCN and the identifier of the PLMN, and stores a correspondence between the selection assistance information of the DCN and the identifier of the PLMN in the user location information.

Specifically, in addition to storing the correspondence between the selection assistance information of the DCN and the identifier of the PLMN to which the DCN serving node belongs, the UE further stores the correspondence between the selection assistance information of the DCN and the identifier of the common PLMN that is obtained from the SIB message, or stores the correspondence between the selection assistance information of the DCN and the identifier of the common PLMN included in the user location information carried in the access feedback message.

S310. The UE sends a NAS complete message to the DCN serving node.

Specifically, the UE returns the NAS complete message to the DCN serving node.

S311. The UE obtains an identifier that is of a PLMN and that is broadcast and sent by a dedicated RAN node.

Specifically, when the UE moves to coverage of the dedicated RAN node from coverage of the shared RAN node, the UE receives the identifier that is of the PLMN and that is broadcast by the dedicated RAN node.

S312. The UE sets up a connection to the dedicated RAN node according to the identifier that is of the PLMN and that is broadcast by the dedicated RAN node.

Specifically, the UE sets up the RRC connection to the dedicated RAN node according to the identifier that is of the PLMN and that is broadcast by the dedicated RAN node.

S313. The UE determines an accessed DCN according to the identifier that is of the PLMN and that is broadcast by the dedicated RAN node, the stored correspondence between the selection assistance information of the DCN and the identifier of the PLMN that serves the UE, and a correspondence between the selection assistance information of the DCN and the identifier of the common PLMN.

Figure 4:
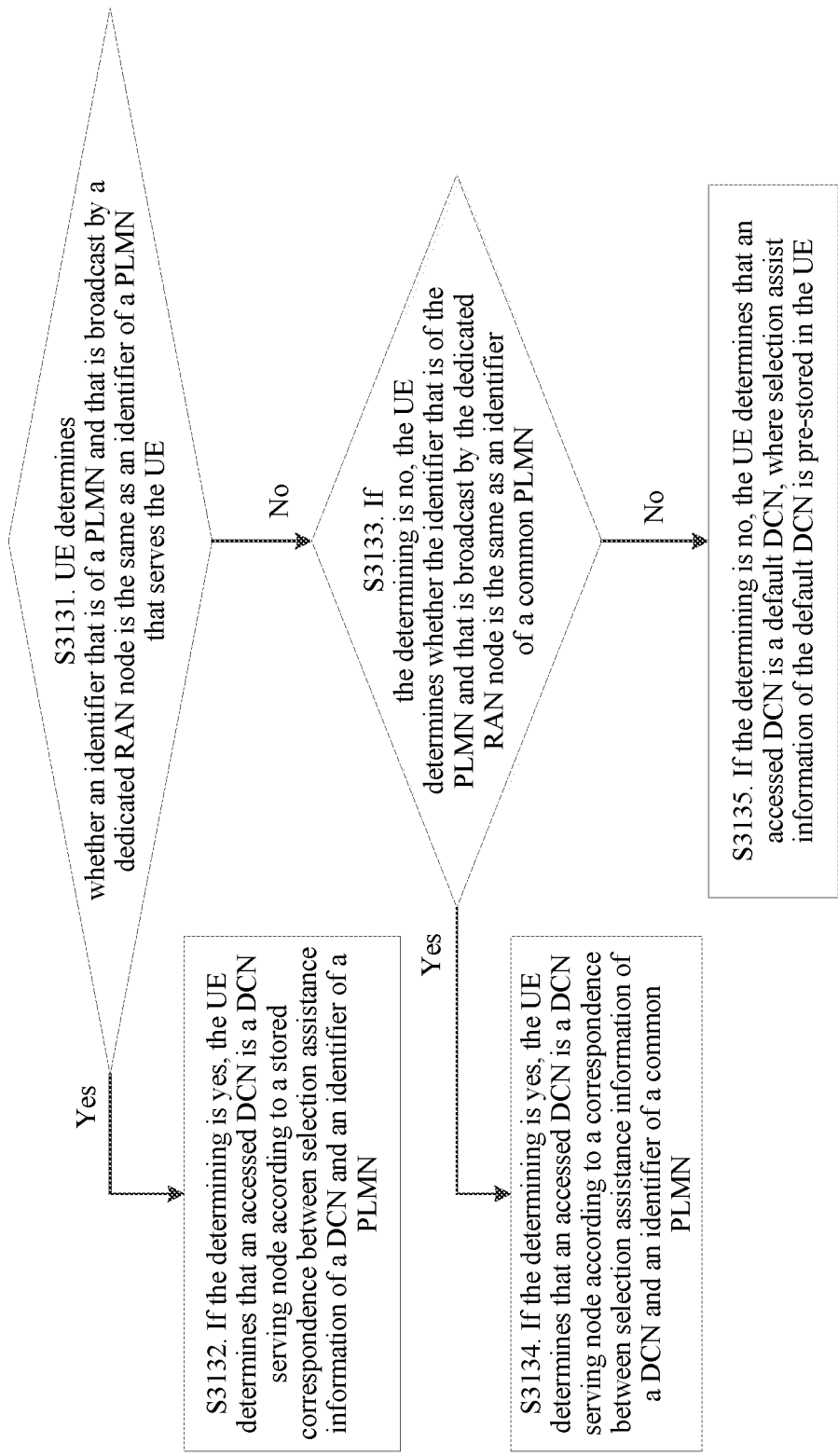
FIG. 4 is a specific schematic flowchart of step S313 in FIG. 3C.
Figure 5A:
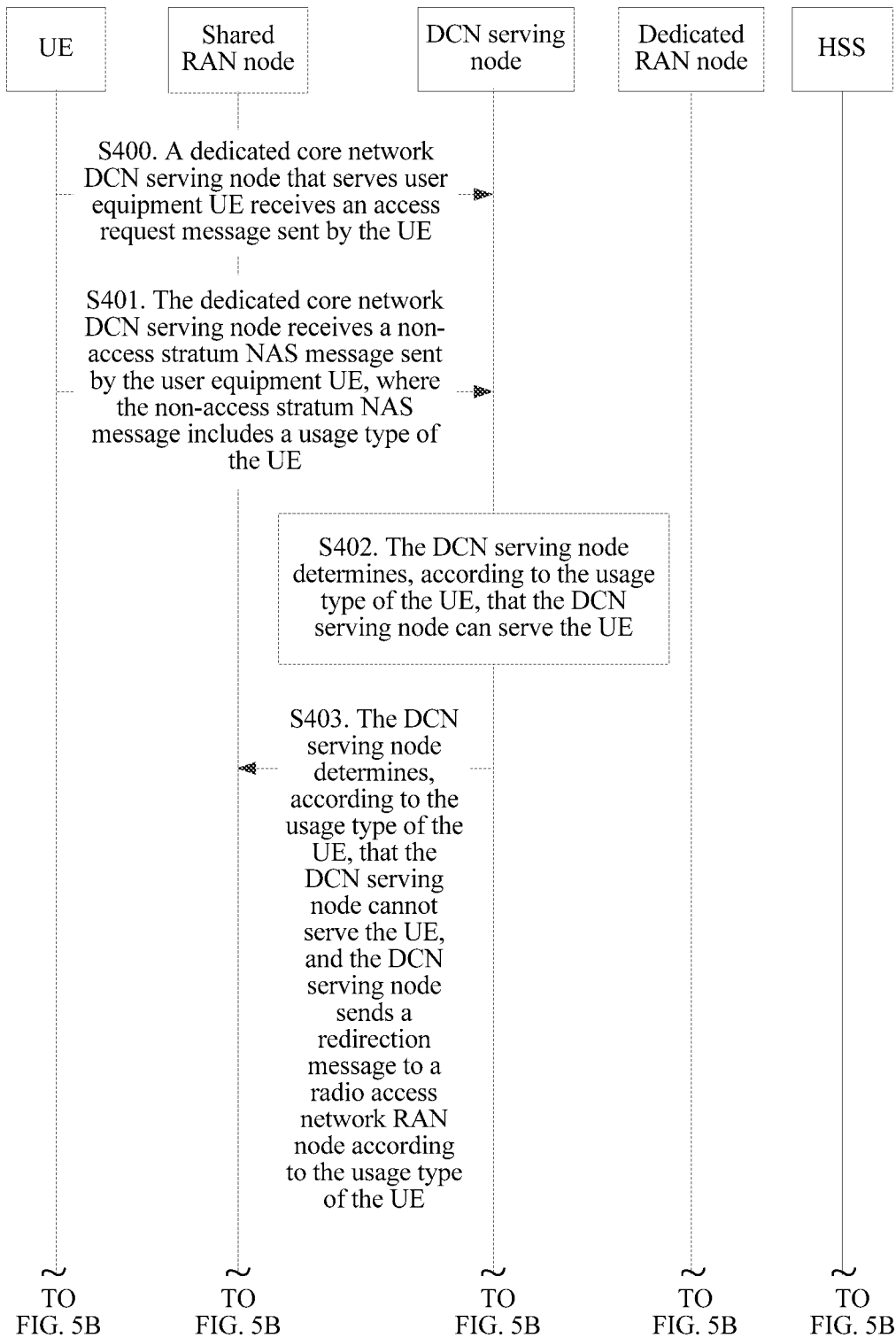
FIG. 5A, FIG. 5B, FIG. 5C, and FIG. 5D are a schematic flowchart of another method for determining access to a public land mobile network PLMN according to an embodiment of the present application.
Figure 5B:
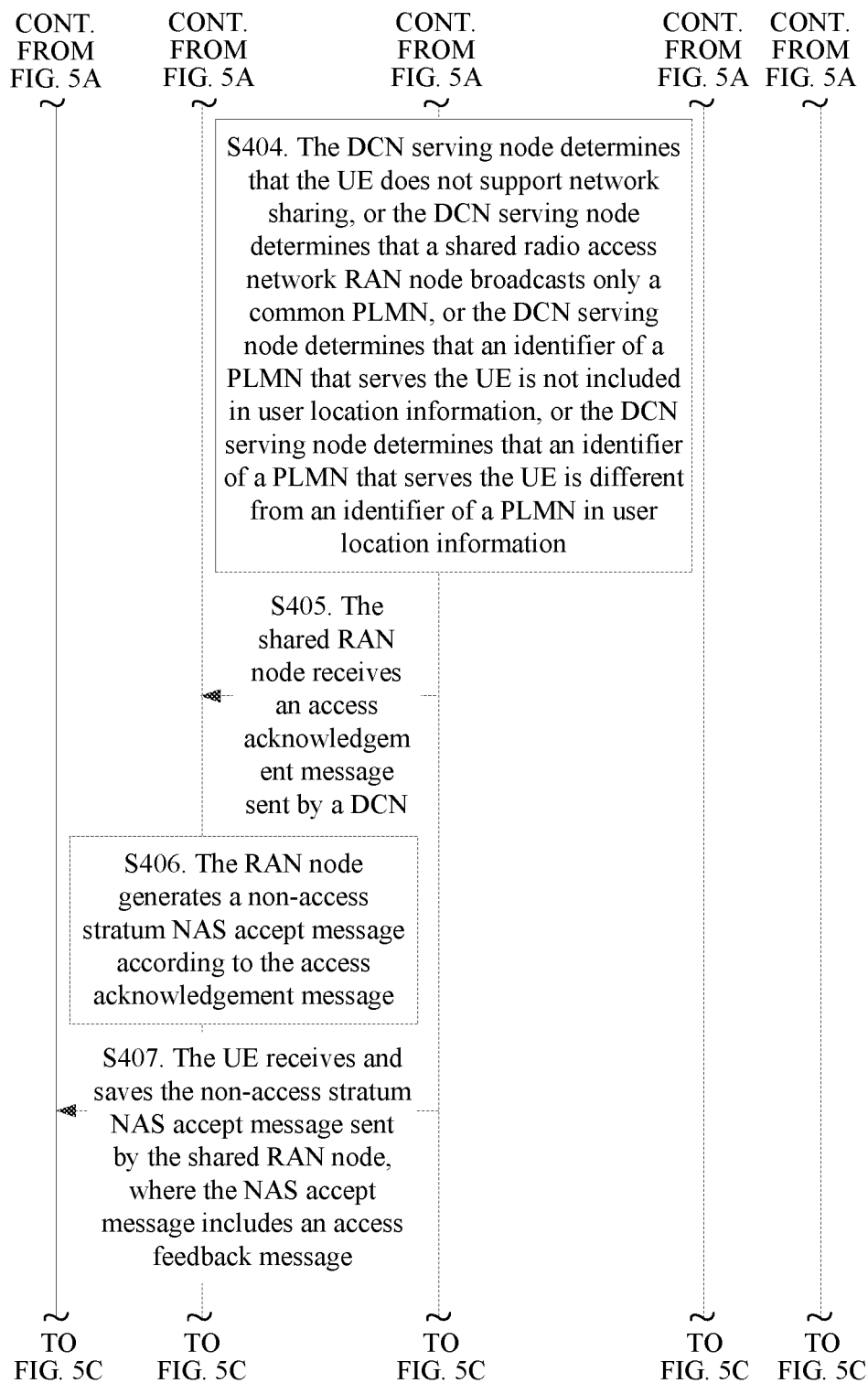
Figure 5C:
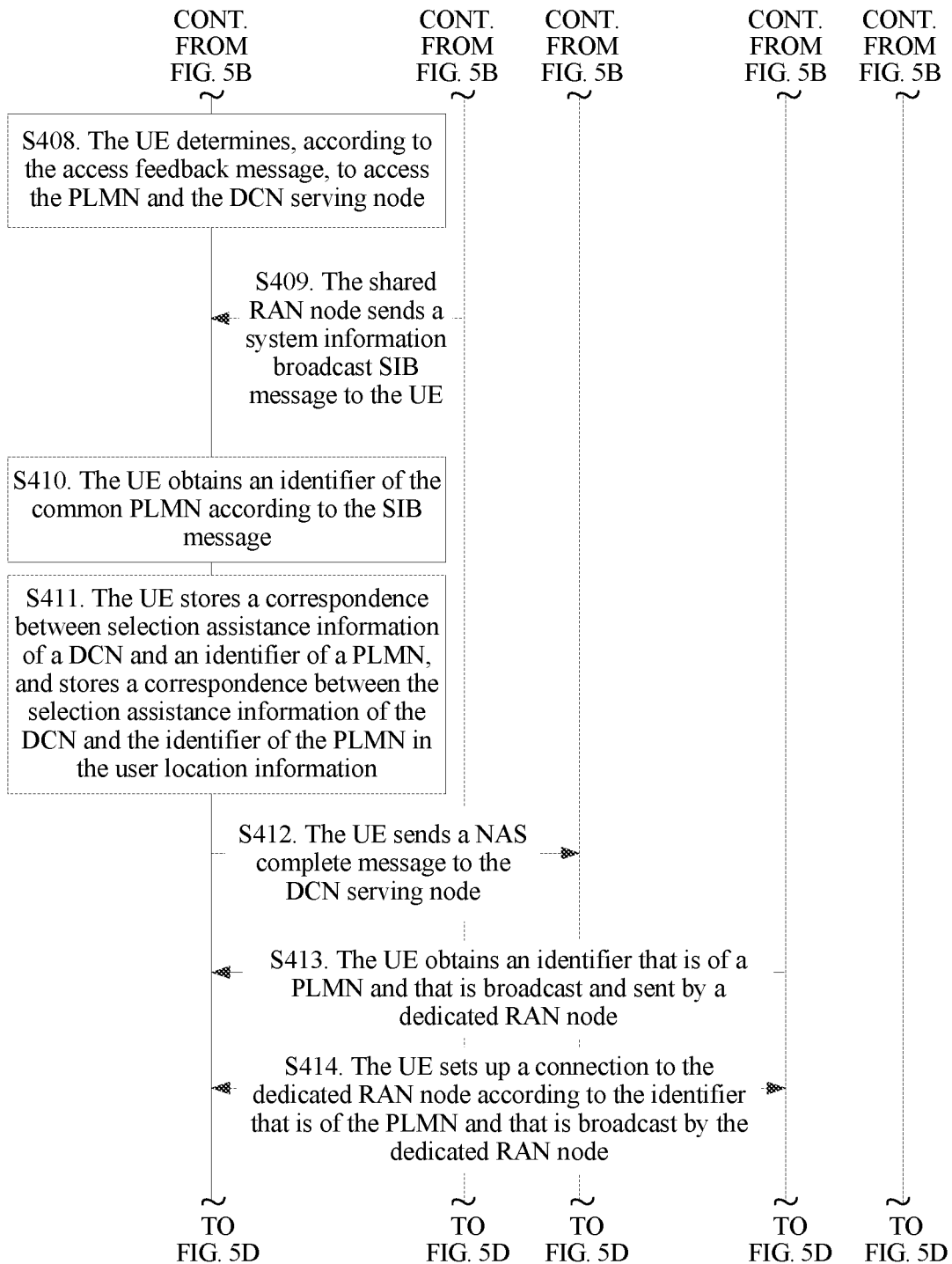
Figure 5D:
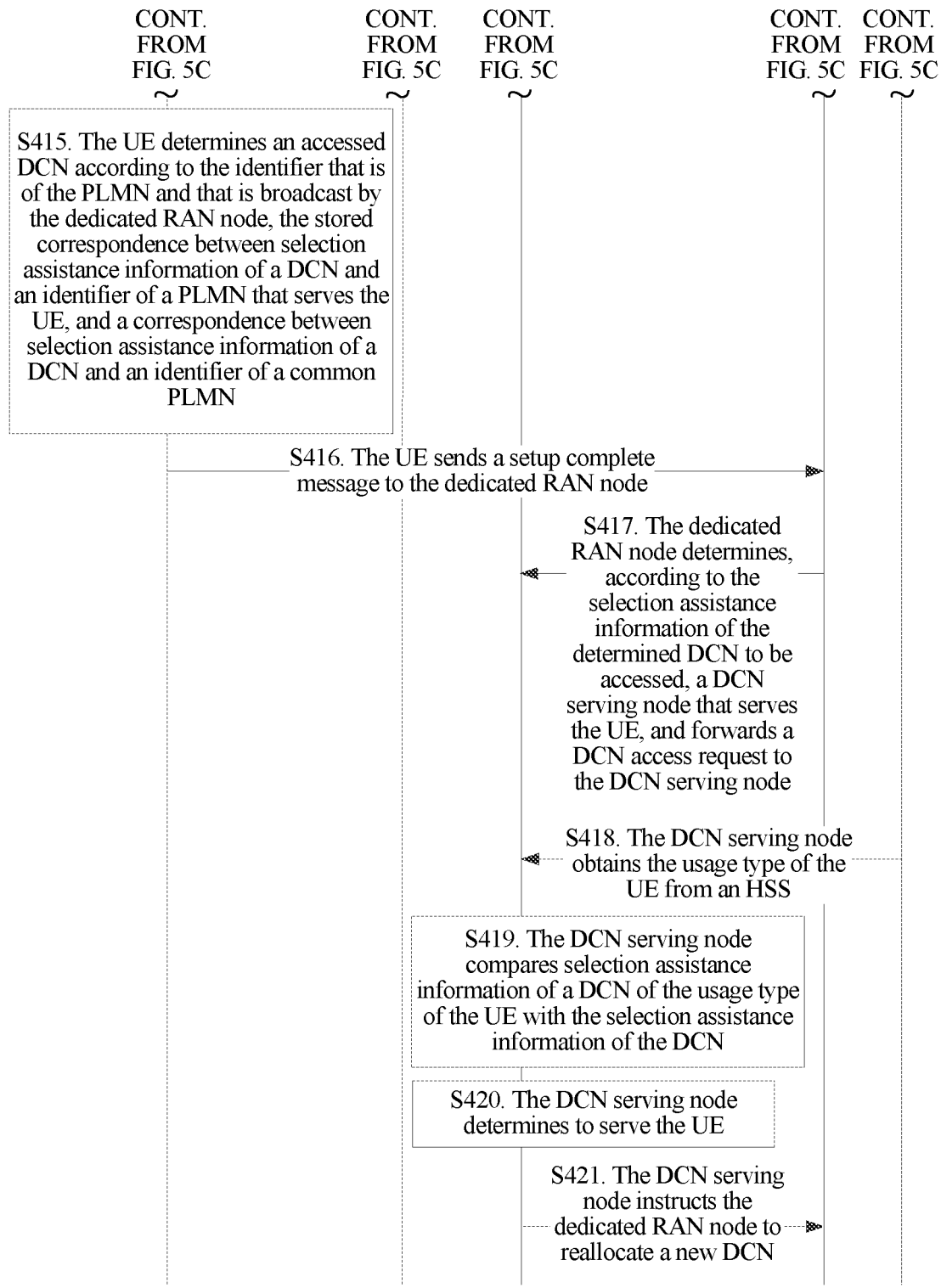

Specifically, as shown in FIG. 4, step S313 includes the following steps.

S3131. The UE determines whether the identifier that is of the PLMN and that is broadcast by the dedicated RAN node is the same as the identifier of the PLMN that serves the UE.

Specifically, the UE determines whether the identifier that is of the PLMN and that is broadcast by the dedicated RAN node is the same as a pre-stored identifier of the PLMN that serves the UE, and when the UE pre-stores the identifier of the PLMN that serves the UE and the identifier of the common PLMN, the UE may first determine whether the identifier that is of the PLMN and that is broadcast by the dedicated RAN node is the same as the identifier of the PLMN that serves the UE.

S3132. If the UE determines that the identifier that is of the PLMN and that is broadcast by the dedicated RAN node is the same as the identifier of the PLMN that serves the UE, the UE determines, according to the stored correspondence between the selection assistance information of the DCN and the identifier of the PLMN, that the accessed DCN is a DCN serving node.

Specifically, when determining that the identifier that is of the PLMN and that is broadcast by the dedicated RAN node is the same as the identifier of the PLMN that serves the UE, the UE determines, according to the stored correspondence between the selection assistance information of the DCN and the identifier of the PLMN that serves the UE, that the requested DCN to be accessed is a DCN serving node.

S3133. If the UE determines that the identifier that is of the PLMN and that is broadcast by the dedicated RAN node is different from the identifier of the PLMN that serves the UE, the UE determines whether the identifier that is of the PLMN and that is broadcast by the dedicated RAN node is the same as the identifier of the common PLMN.

Specifically, when determining that the identifier that is of the PLMN and that is broadcast by the dedicated RAN node is different from the identifier of the PLMN that serves the UE, the UE compares the identifier that is of the PLMN and that is broadcast by the dedicated RAN node with the identifier of the common PLMN.

S3134. If the identifier that is of the PLMN and that is broadcast by the dedicated RAN node is the same as the identifier of the common PLMN, the UE determines, according to the correspondence between the selection assistance information of the DCN and the identifier of the common PLMN, that the accessed DCN is a DCN serving node.

Specifically, when determining that the identifier that is of the PLMN and that is broadcast by the dedicated RAN node is the same as the identifier of the common PLMN, the UE determines, according to the correspondence between the selection assistance information of the DCN and the identifier of the common PLMN, that the requested DCN to be accessed is a DCN serving node.

S3135. If the identifier that is of the PLMN and that is broadcast by the dedicated RAN node is different from the identifier of the common PLMN, the UE cannot determine the requested DCN to be accessed, and the UE includes the usage type of the UE in the NAS message, where the usage type of the UE is pre-stored in the UE.

Specifically, when the UE determines that the identifier that is of the PLMN and that is broadcast by the dedicated RAN node is different from the identifier of the common PLMN, the UE cannot determine the requested DCN to be accessed, and the UE includes the usage type of the UE in the NAS message. The usage type of the UE is pre-stored in the UE.

S314. The UE sends a setup complete message to the dedicated RAN node.

Specifically, the setup complete message sent by the UE to the dedicated RAN node may be an RRC setup complete message. The setup complete message carries selection assistance information of a determined DCN to be accessed and a DCN access request, and the DCN access request is used to request the dedicated RAN node to configure, for the UE, the DCN indicated by the selection assistance information of the determined DCN to be accessed. The DCN access request may be an NAS message.

S315. The dedicated RAN node determines, according to the selection assistance information of the determined DCN to be accessed, a DCN serving node that serves the UE, and forwards a DCN access request to the DCN serving node.

Specifically, the dedicated RAN node determines, according to the selection assistance information of the determined DCN to be accessed, the DCN serving node that serves the UE, and forwards the DCN access request to the DCN serving node by using an S1-AP message.

Optionally, if in step S3135, the UE cannot determine the requested DCN to be accessed, the setup complete message does not carry the selection assistance information of the DCN. Therefore, after receiving the setup complete message, the dedicated RAN node randomly selects a DCN and a DCN serving node. An embodiment of randomly selecting a DCN and a DCN serving node is not described in detail in this embodiment.

S316. The DCN serving node obtains the usage type of the UE from an HSS.

Specifically, the HSS is configured to store usage type information of the UE, and the usage type of the UE includes selection assistance information of a DCN applicable to the UE. After the DCN serving node receives the DCN access request sent by the shared RAN node or the dedicated RAN node, the DCN serving node sends a UE usage type obtaining request to the HSS, and the HSS sends the usage type of the UE to the DCN serving node according to the obtaining request sent by the DCN serving node.

S317. The DCN serving node compares selection assistance information of a DCN of the usage type of the UE with the selection assistance information of the DCN.

S318. The DCN serving node determines to serve the UE.

Specifically, if the selection assistance information of the DCN matches the selection assistance information of the DCN that is of the usage type of the UE and that is applicable to the UE, the DCN serving node determines to serve the UE.

S319. The DCN serving node instructs the dedicated RAN node to allocate a new DCN.

Specifically, if the selection assistance information of the DCN does not match the selection assistance information of the DCN that is of the usage type of the UE and that is applicable to the UE, it indicates that a communications type of the UE in this case changes, and accordingly, a type of a DCN applicable to the UE also changes. The DCN serving node instructs the dedicated RAN node to allocate a new DCN.

It can be learned from the foregoing description that in this embodiment, a currently accessed DCN informs UE of an identifier of a currently accessed PLMN that serves the UE, so that the UE can determine a PLMN to which the currently accessed DCN belongs, and store a correspondence between selection assistance information of the DCN and the identifier of the PLMN that serves the UE. When moving to coverage of the PLMN, the UE can directly determine, according to the stored correspondence, a requested DCN to be accessed, and request a RAN node to access the determined DCN. In addition, after an NAS message is forwarded by a shared RAN node and received by a DCN serving node, the DCN serving node may quickly determine, according to a usage type of the UE, whether the DCN serving node can serve the UE. If the DCN serving node cannot serve the UE, the UE may be quickly redirected to a DCN serving node that can serve the UE, and the DCN serving node does not need request subscription data from an HSS. Then it is determined, according to a usage type of the UE in the subscription data, whether the DCN serving node can serve the UE. Therefore, a redirection process is reduced, and resource overheads are reduced.

FIG. 5A, FIG. 5B, FIG. 5C, and FIG. 5D are a schematic flowchart of another dedicated core network DCN processing method for a public land mobile network PLMN according to an embodiment of the present application. The method is implemented by the UE, the shared RAN node, the DCN serving node, the dedicated RAN node, and the HSS in the system architecture shown in FIG. 1, and mainly describes a process of determining access to a PLMN. In addition, in this embodiment, interaction between the UE, the shared RAN node, and the DCN serving node is applicable to a network sharing scenario, and interaction between the UE, the dedicated RAN node, and the HSS is applicable to a dedicated network scenario.

As shown in FIG. 5A, FIG. 5B, FIG. 5C, and FIG. 5D, in this embodiment, a procedure of the dedicated core network DCN processing method for a public land mobile network PLMN may include the following steps.

S400. A dedicated core network DCN serving node that serves user equipment UE receives an access request message sent by the UE.

S401. The dedicated core network DCN serving node receives a non-access stratum NAS message sent by the user equipment UE, where the non-access stratum NAS message includes a usage type of the UE.

S402. The DCN serving node determines, according to the usage type of the UE, that the DCN serving node can serve the UE.

S403. The DCN serving node determines, according to the usage type of the UE, that the DCN serving node cannot serve the UE, and the DCN serving node sends a redirection message to a radio access network RAN node according to the usage type of the UE.

S404. The DCN serving node determines that the UE does not support network sharing, or the DCN serving node determines that a shared radio access network RAN node broadcasts only a common PLMN, or the DCN serving node determines that an identifier of the PLMN that serves the UE is not included in the user location information, or the DCN serving node determines that an identifier of the PLMN that serves the UE is different from an identifier of a PLMN in the user location information.

Specifically, for details of steps S400 to S404, refer to steps S300 to S304 in the embodiment of FIG. 3A, FIG. 3B, FIG. 3C, and FIG. 3D. Details are not described in this embodiment.

S405. The shared RAN node receives an access acknowledgement message sent by the DCN serving node.

Specifically, in this embodiment, the shared RAN node may inform the UE of an access feedback message by using an RRC message. The shared RAN node may inform the UE at a time when the shared RAN node receives the access acknowledgement message sent by the DCN. The access acknowledgement message is used to indicate that the DCN agrees to serve the UE, and request the shared RAN node to send the access feedback message to the UE. In this case, the DCN does not need to send the access feedback message to the UE.

S406. The shared RAN node generates a non-access stratum NAS accept message according to the access acknowledgement message.

Specifically, the shared RAN node may determine, by obtaining a type of the access acknowledgement message, to send the access feedback message to the UE. The shared RAN node may send the access feedback message to the UE at a time when the shared RAN node determines that the type of the access acknowledgement message may be a context setup request message or a downlink transfer message. The context setup request message may be an initial context setup request message, and the downlink transfer message may be a direct downlink transfer message. After the shared RAN node receives the access acknowledgement message sent by the DCN, if the type of the access acknowledgement message is a context setup request message or a downlink transfer message, the non-access stratum NAS accept message is generated.

S407. The UE receives and saves the non-access stratum NAS accept message sent by the shared RAN node, where the NAS accept message includes an access feedback message.

Specifically, the shared RAN node sends the NAS accept message to the UE by using the RRC message, the NAS accept message carries the access feedback message, and the access feedback message carries user location information, selection assistance information of a DCN, and an identifier of a PLMN to which the DCN serving node belongs, to indicate a PLMN that is actually accessed by the DCN serving node.

S408. The UE determines, according to the access feedback message, to access the PLMN and the DCN serving node.

S409. The shared RAN node sends a system information broadcast SIB message to the UE.

S410. The UE obtains an identifier of the common PLMN according to the SIB message.

S411. The UE stores a correspondence between selection assistance information of the DCN and the identifier of the PLMN, and stores a correspondence between the selection assistance information of the DCN and the identifier of the PLMN in the user location information.

S412. The UE sends a NAS complete message to the DCN serving node.

S413. The UE obtains an identifier that is of a PLMN and that is broadcast and sent by a dedicated RAN node.

S414. The UE sets up a connection to the dedicated RAN node according to the identifier that is of the PLMN and that is broadcast by the dedicated RAN node.

S415. The UE determines an accessed DCN according to the identifier that is of the PLMN and that is broadcast by the dedicated RAN node, the stored correspondence between the selection assistance information of the DCN and the identifier of the PLMN, and a correspondence between the selection assistance information of the DCN and the identifier of the common PLMN.

Specifically, for details of specific steps included in S415, refer to steps S3131 to S3135 in the embodiment of FIG. 4. Details are not described in this embodiment.

S416. The UE sends a setup complete message to the dedicated RAN node.

S417. The dedicated RAN node determines, according to the selection assistance information of the determined DCN to be accessed, a DCN serving node that serves the UE, and forwards a DCN access request to the DCN serving node.

S418. The DCN serving node obtains the usage type of the UE from an HSS.

S419. The DCN serving node compares selection assistance information of a DCN of the usage type of the UE with the selection assistance information of the DCN.

S420. The DCN serving node determines to serve the UE.

S421. The DCN serving node instructs the dedicated RAN node to allocate a new DCN.

Specifically, for details of steps S408 to S421, refer to steps S306 to S319 in the embodiment of FIG. 3A, FIG. 3B, FIG. 3C, and FIG. 3D. Details are not described in this embodiment.

It can be learned from the foregoing description that in this embodiment, a currently accessed shared RAN node informs, by using an RRC message, UE of an identifier of a currently accessed PLMN that serves the UE, so that the UE can determine a PLMN to which a currently accessed DCN belongs, and store a correspondence between selection assistance information of the DCN and the identifier of the PLMN that serves the UE. When moving to coverage of the PLMN, the UE can directly determine, according to the stored correspondence, a requested DCN to be accessed, and request a RAN node to access the determined DCN. In addition, after an NAS message is forwarded by a shared RAN node and received by a DCN serving node, the DCN serving node may quickly determine, according to a usage type of the UE, whether the DCN serving node can serve the UE. If the DCN serving node cannot serve the UE, the UE may be quickly redirected to a DCN serving node that can serve the UE, and the DCN serving node does not need request subscription data from an HSS. Then it is determined, according to a usage type of the UE in the subscription data, whether the DCN serving node can serve the UE. Therefore, a redirection process is reduced, and resource overheads are reduced.

Figure 6:
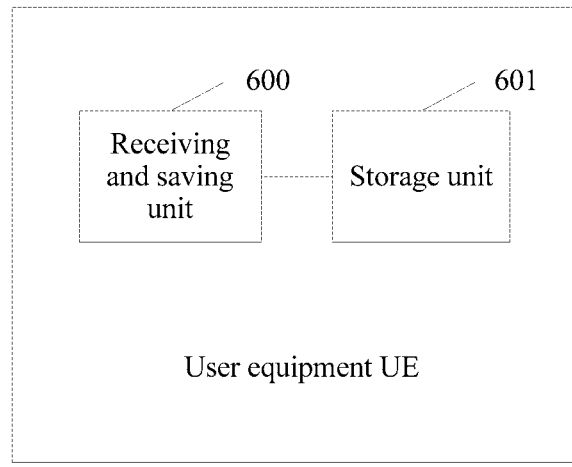
FIG. 6 is a schematic structural diagram of user equipment UE according to an embodiment of the present application.

Referring to FIG. 6, FIG. 6 is a schematic structural diagram of user equipment UE according to an embodiment of the present application. The UE shown in FIG. 6 includes a receiving and saving unit 600 and a storage unit 601.

The receiving and saving unit 600 is configured to receive and save, in a shared network, an access feedback message sent by a network side. The access feedback message includes user location information, selection assistance information of a dedicated core network DCN that serves the UE, and an identifier of a public land mobile network PLMN that serves the UE, and the identifier of the PLMN that serves the UE is different from an identifier of a PLMN in the user location information.

The storage unit 601 is configured to: store a correspondence between the selection assistance information of the DCN and the identifier of the PLMN, and store a correspondence between the selection assistance information of the DCN and the identifier of the PLMN in the user location information. The function unit is configured to perform related steps of step S309 in the embodiment of FIG. 3A, FIG. 3B, FIG. 3C, and FIG. 3D and step S411 in the embodiment of FIG. 5A, FIG. 5B, FIG. 5C, and FIG. 5D.

The receiving and saving unit 600 is specifically configured to: receive and save a non-access stratum NAS accept message sent by a DCN serving node. The NAS accept message includes the access feedback message. The function unit is configured to perform related steps of step S305 in the embodiment of FIG. 3A, FIG. 3B, FIG. 3C, and FIG. 3D and step S407 in the embodiment of FIG. 5A, FIG. 5B, FIG. 5C, and FIG. 5D.

Figure 7:
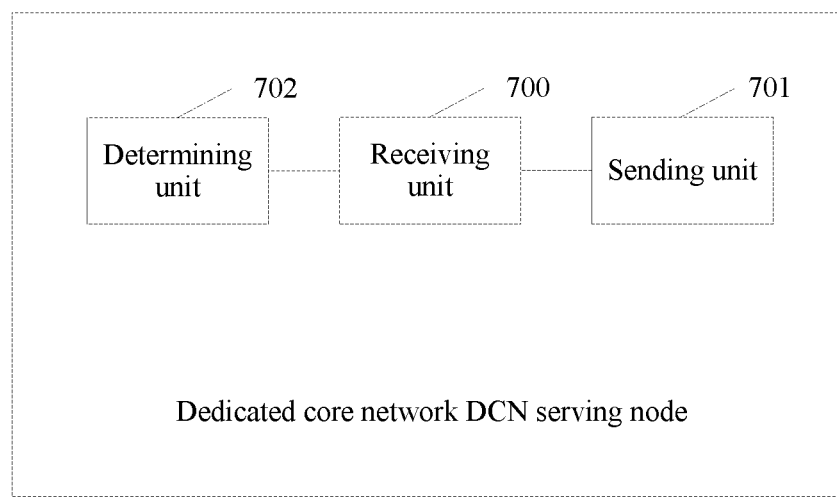
FIG. 7 is a schematic structural diagram of a dedicated core network DCN serving node according to an embodiment of the present application.

Referring to FIG. 7, FIG. 7 is a schematic structural diagram of a dedicated core network DCN serving node according to an embodiment of the present application. The DCN serving node shown in FIG. 7 includes a receiving unit 700 and a sending unit 701.

The receiving unit 700 is configured to receive an access request message sent by user equipment UE. The function unit is configured to perform related steps of step S300 in the embodiment of FIG. 3A, FIG. 3B, FIG. 3C, and FIG. 3D and step S400 in the embodiment of FIG. 5A, FIG. 5B, FIG. 5C, and FIG. 5D.

The sending unit 701 is configured to send an access feedback message to the UE. The access feedback message includes user location information, selection assistance information of a DCN that serves the UE, and an identifier of a public land mobile network PLMN that serves the UE, and the identifier of the PLMN that serves the UE is different from an identifier of a PLMN in the user location information.

The function unit is configured to perform related steps of step S305 in the embodiment of FIG. 3A, FIG. 3B, FIG. 3C, and FIG. 3D and step S407 in the embodiment of FIG. 5A, FIG. 5B, FIG. 5C, and FIG. 5D.

Optionally, the DCN serving node further includes a determining unit 702.

The determining unit 702 is configured to: determine that the UE does not support network sharing, or determine that a shared radio access network RAN node broadcasts only a common PLMN, or determine that the identifier of the PLMN that serves the UE is not included in the user location information, or determine that the identifier of the PLMN that serves the UE is different from the identifier of the PLMN in the user location information. The function unit is configured to perform related steps of step S304 in the embodiment of FIG. 3A, FIG. 3B, FIG. 3C, and FIG. 3D and step S404 in the embodiment of FIG. 5A, FIG. 5B, FIG. 5C, and FIG. 5D.

Figure 8:
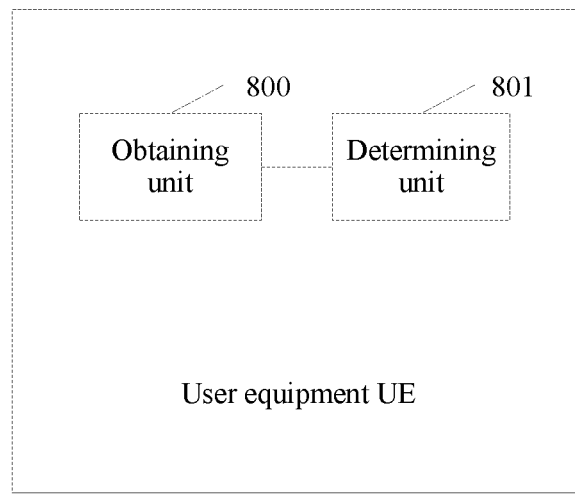
FIG. 8 is a schematic structural diagram of another user equipment UE according to an embodiment of the present application.

Referring to FIG. 8, FIG. 8 is a schematic structural diagram of another user equipment UE according to an embodiment of the present application. The UE shown in FIG. 8 includes an obtaining unit 800 and a determining unit 801.

The obtaining unit 800 is configured to obtain an identifier of an accessed PLMN, and the determining unit 801 is configured to determine that the accessed PLMN has corresponding selection assistance information of a dedicated core network DCN that serves the UE, so that the UE includes the selection assistance information of the DCN in an access request message sent to a radio access network RAN node.

Alternatively, the obtaining unit 800 is configured to obtain an identifier of an accessed PLMN, and the determining unit 801 is configured to determine that the accessed PLMN has no corresponding selection assistance information of a DCN that serves the UE, so that the UE includes a usage type of the UE in the access request message sent to the RAN node.

Optionally, the determining unit 801 is specifically configured to:

obtain a correspondence between an identifier of a public land mobile network PLMN and selection assistance information of a DCN, so that the UE determines, according to the identifier of the accessed PLMN and the correspondence, that the accessed PLMN has the corresponding selection assistance information of the dedicated core network DCN that serves the UE.

Optionally, the determining unit 801 is specifically configured to:

when the UE has no correspondence between an identifier of a public land mobile network PLMN and selection assistance information of a DCN, determine that the accessed PLMN has no corresponding selection assistance information of the DCN that serves the UE; or obtain a correspondence between an identifier of a public land mobile network PLMN and selection assistance information of a DCN, and determine, according to the identifier of the accessed PLMN and the correspondence, that the accessed PLMN has no corresponding selection assistance information of the dedicated core network DCN that serves the UE.

Optionally, the determining unit 801 is specifically configured to:

receive a correspondence that is between an identifier of a PLMN and selection assistance information of a DCN and that is sent by a network side; or obtain a stored correspondence between an identifier of a PLMN and selection assistance information of a DCN.

Optionally, the access request message includes a non-access stratum NAS message.

That the access request message includes the usage type of the UE is specifically: the NAS message includes the usage type of the UE.

Optionally, the usage type of the UE is pre-configured in the UE.

Optionally, the determining unit 801 is specifically configured to:

determine that the accessed public land mobile network PLMN has the corresponding selection assistance information of the dedicated core network DCN that serves the UE, so that the UE includes the selection assistance information of the DCN and the usage type of the UE in the access request message sent to the radio access network RAN node.

Optionally, the access request message includes a non-access stratum NAS message.

That the access request message includes the usage type of the UE is specifically: the NAS message includes the usage type of the UE.

The function unit is configured to perform related steps of steps S300 to S301 in the embodiment of FIG. 3A, FIG. 3B, FIG. 3C, and FIG. 3D and steps S400 to S401 in the embodiment of FIG. 5A, FIG. 5B, FIG. 5C, and FIG. 5D.

Figure 9:
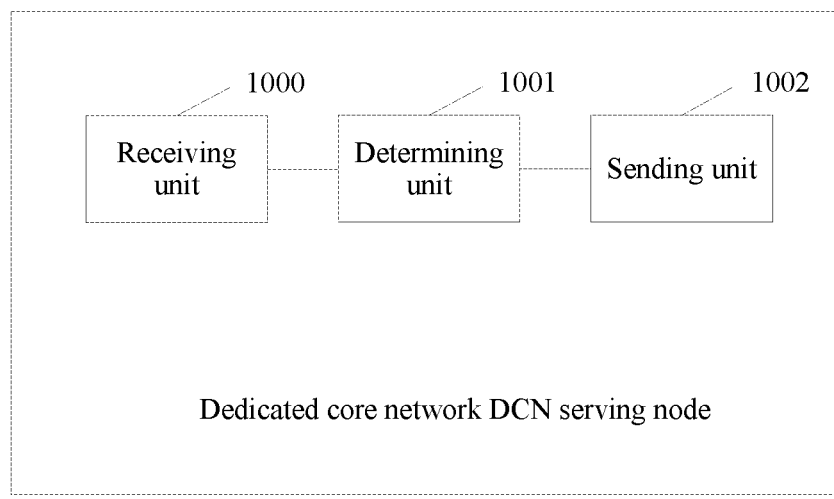
FIG. 9 is a schematic structural diagram of another dedicated core network DCN serving node according to an embodiment of the present application.

Referring to FIG. 9, FIG. 9 is a schematic structural diagram of another dedicated core network DCN serving node according to an embodiment of the present application. The DCN serving node shown in FIG. 9 includes a receiving unit 1000, a determining unit 1001, and a sending unit 1002.

The receiving unit 1000 is configured to receive a non-access stratum NAS message sent by user equipment UE. The non-access stratum NAS message includes a usage type of the UE.

The determining unit 1001 is configured to determine, according to the usage type of the UE, that the DCN serving node can serve the UE; or the determining unit 1001 is configured to determine, according to the usage type of the UE, that the DCN serving node cannot serve the UE.

The sending unit 1002 is configured to send a redirection message to a radio access network RAN node according to the usage type of the UE.

The foregoing function units are configured to perform related steps of steps S301 to S303 in the embodiment of FIG. 3A, FIG. 3B, FIG. 3C, and FIG. 3D and steps S401 to S403 in the embodiment of FIG. 5A, FIG. 5B, FIG. 5C, and FIG. 5D.

Optionally, the determining unit 1001 is specifically configured to:

request subscription data of the UE from a home subscriber server HSS, where the subscription data includes the usage type of the UE; and allocate selection assistance information of a DCN according to the usage type of the UE provided by the UE and/or the usage type of the UE stored in the HSS, and send the selection assistance information of the DCN to the UE.

The foregoing function units are configured to perform related steps of step S302 in the embodiment of FIG. 3A, FIG. 3B, FIG. 3C, and FIG. 3D and step S402 in the embodiment of FIG. 5A, FIG. 5B, FIG. 5C, and FIG. 5D.

An embodiment of the present application further provides a computer storage medium that is configured to store a computer software instruction used by the UE shown in FIG. 6, FIG. 8, and FIG. 9, and the computer software instruction includes a program designed for implementing the foregoing method embodiments. According to the foregoing methods, resource overheads can be reduced.

An embodiment of the present application further provides a computer storage medium that is configured to store a computer software instruction used by the DCN serving nodes shown in FIG. 7 and FIG. 9, and the computer software instruction includes a program designed for implementing the foregoing method embodiments. According to the foregoing methods, resource overheads can be reduced.

With descriptions of the foregoing embodiments, it may be clearly understood by persons skilled in the art that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely example embodiments of the present application, and certainly is not intended to limit the protection scope of the present application. Therefore, equivalent variations made in accordance with the claims of the present application shall fall within the scope of the present application.

What is claimed is:

1. A dedicated core network (DCN) processing method for a public land mobile network (PLMN), applied to a network sharing scenario, the method comprising:

obtaining, by a user equipment (UE), an identifier of an accessed PLMN;

determining, by the UE, that the accessed PLMN has corresponding selection assistance information of a DCN that serves the UE; and including, by the UE, the selection assistance information of the DCN in an access request message sent to a radio access network (RAN) node;

wherein the determining, by the UE, that the accessed PLMN has the corresponding selection assistance information of the DCN that serves the UE comprises:

obtaining, by the UE, a correspondence between an identifier of a PLMN and selection assistance information of a DCN; and determining, by the UE according to the identifier of the accessed PLMN and the correspondence, that the accessed PLMN has the corresponding selection assistance information of the DCN that serves the UE.

2. The method according to claim 1, wherein the determining, by the UE, that the accessed PLMN has no corresponding selection assistance information of the DCN that serves the UE comprises:

when the UE has no correspondence between an identifier of a PLMN and selection assistance information of a DCN, determining, by the UE, that the accessed PLMN has no corresponding selection assistance information of the DCN that serves the UE; or obtaining, by the UE, a correspondence between an identifier of a PLMN and selection assistance information of a DCN, and determining, by the UE according to the identifier of the accessed PLMN and the correspondence, that the accessed PLMN has no corresponding selection assistance information of the DCN that serves the UE.

3. The method according to claim 1, wherein the obtaining, by the UE, the correspondence between the identifier of the PLMN and the selection assistance information of the DCN comprises:

obtaining, by the UE, a stored correspondence between the identifier of the PLMN and the selection assistance information of the DCN.

4. A user equipment (UE), comprising a memory and at least one processor, wherein the memory is configured to store a program, and wherein the at least one processor is configured to invoke the program in the memory, wherein the program instructs the at least one processor to:

obtain an identifier of an accessed public land mobile network (PLMN);

determine that the accessed PLMN has corresponding selection assistance information of a dedicated core network (DCN) that serves the UE; and send an access request message to a radio access network (RAN) node, wherein the access request message comprises the selection assistance information of the DCN;
wherein in determining that the accessed PLMN has the corresponding selection assistance information of a DCN that serves the UE the program further instructs the at least one processor to:
obtain a correspondence between an identifier of a PLMN and selection assistance information of a DCN; and
determine, according to the identifier of the accessed PLMN and the correspondence, that the accessed PLMN has the corresponding selection assistance information of the DCN that serves the UE.

5. The UE according to claim 4, wherein the program further instructs the at least one processor to:
obtain a stored correspondence between an identifier of a PLMN and selection assistance information of a DCN.

6. A system for a network sharing scenario, comprising a user equipment (UE) and a radio access network (RAN) node, wherein:
the UE is configured to:
obtain an identifier of an accessed PLMN;
determine that the accessed PLMN has corresponding selection assistance information of a DCN that serves the UE, wherein in determining that the accessed PLMN has the corresponding selection assistance information of the DCN that serves the UE, the UE is further configured to:
obtain a correspondence between an identifier of a PLMN and selection assistance information of a DCN; and
determine, according to the identifier of the accessed PLMN and the correspondence, that the accessed PLMN has the corresponding selection assistance information of the DCN that serves the UE; and
send an access request message to the RAN node; and
the RAN node is configured to receive the access request message, wherein the access request message comprises the selection assistance information of the DCN.

7. The system according to claim 6, wherein:
the UE is further configured to obtain a stored correspondence between an identifier of a PLMN and selection assistance information of a DCN.

8. A non-transitory computer-readable media storing computer instructions, that when executed by one or more processors of a User Equipment (UE), cause the UE to perform steps comprising:
obtaining an identifier of an accessed public land mobile network (PLMN);
determining that the accessed PLMN has corresponding selection assistance information of a dedicated core network (DCN) that serves the UE; and
sending an access request message to a radio access network (RAN) node, wherein the access request message comprises the selection assistance information of the DCN;
wherein in the determining that the accessed PLMN has the corresponding selection assistance information of the DCN that serves the UE, the instructions further cause the UE to perform steps comprising:
obtaining a correspondence between an identifier of a PLMN and selection assistance information of a DCN; and
determining, according to the identifier of the accessed PLMN and the correspondence, that the accessed PLMN has the corresponding selection assistance information of the DCN that serves the UE.

9. The non-transitory computer-readable media according to claim 8, wherein the instructions further cause the UE to perform steps comprising:
obtaining a stored correspondence between an identifier of a PLMN and selection assistance information of a DCN.

* * * * *